(12) United States Patent
Friedman et al.

(10) Patent No.: US 11,621,918 B2
(45) Date of Patent: Apr. 4, 2023

(54) TECHNIQUES TO MANAGE DATA TRANSMISSIONS

(71) Applicant: Intel Corporation, Santa Clara, CA (US)

(72) Inventors: Ben-Zion Friedman, Jerusalem (IL); Simoni Ben-Michael, Givat Zeev (IL); Arvind Srinivasan, San Jose, CA (US); Tony Hurson, Austin, TX (US); Adam Conyers, Phoenix, AZ (US); Hemanth Krishnan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 817 days.

(21) Appl. No.: 16/211,064

(22) Filed: Dec. 5, 2018

(65) Prior Publication Data

US 2019/0116121 A1  Apr. 18, 2019

(51) Int. Cl.
*H04L 47/12* (2022.01)
*H04L 47/6295* (2022.01)
*H04L 47/11* (2022.01)
*H04L 47/52* (2022.01)
*H04L 47/62* (2022.01)

(52) U.S. Cl.
CPC .............. *H04L 47/12* (2013.01); *H04L 47/11* (2013.01); *H04L 47/527* (2013.01); *H04L 47/6295* (2013.01); *H04L 47/6215* (2013.01)

(58) Field of Classification Search
CPC ....... H04L 47/12; H04L 47/11; H04L 47/527; H04L 47/6295; H04L 47/6215; H04L 47/215; G06F 13/387; H04J 3/1688
See application file for complete search history.

(56) References Cited

U.S. PATENT DOCUMENTS

| | | | |
|---|---|---|---|
| 5,115,429 A * | 5/1992 | Hluchyj | H04J 3/1688 370/231 |
| 8,520,522 B1 | 8/2013 | Goldman et al. | |
| 8,897,315 B1 | 11/2014 | Arad et al. | |
| 2004/0062259 A1 | 4/2004 | Jeffries et al. | |
| 2004/0230979 A1* | 11/2004 | Beecroft | G06F 13/387 718/100 |
| 2005/0163139 A1 | 7/2005 | Robotham et al. | |

(Continued)

OTHER PUBLICATIONS

Cisco, "Understanding the Packet Counters in the show interface rate Command Output with Committed Access Rate (CAR)", Updated; Feb. 15, 2018, Document ID: 28882, 9 pages.

(Continued)

*Primary Examiner* — Vinncelas Louis
(74) *Attorney, Agent, or Firm* — Compass IP Law PC

(57) ABSTRACT

A transmitter can manage when a transmit queue is permitted to transmit and an amount of data permitted to be transmitted. After a transmit queue is permitted to transmit, the transmit queue can be placed in a sleep state if the transmit queue has exceeded its permitted data transmission quota. The wake time of the transmit queue can be scheduled based on a token accumulation rate for the transmit queue. The token accumulation rate can be increased if the transmit queue has other data to transmit after the data transmission. The token accumulation rate can be decreased if the transmit does not have other data to transmit.

16 Claims, 15 Drawing Sheets

(56) References Cited

U.S. PATENT DOCUMENTS

| | | |
|---|---|---|
| 2011/0128847 A1* | 6/2011 | Noguchi .............. H04L 47/215 |
| | | 370/230.1 |
| 2014/0071831 A1 | 3/2014 | Sinha et al. |
| 2015/0055478 A1 | 2/2015 | Tabatabaee et al. |
| 2016/0173383 A1 | 6/2016 | Liu et al. |
| 2018/0012633 A1 | 1/2018 | Holbrook et al. |
| 2019/0116121 A1 | 4/2019 | Friedman et al. |
| 2019/0116122 A1 | 4/2019 | Friedman et al. |

OTHER PUBLICATIONS

Hugh Barrass, "Rate control for Ethernet congestion management", (Cisco Systems), Congestion Management Task Force, Mar. 2005, Atlanta, Georgia, 25 pages.
Marco Righini, Intel, "Single-Root Input/Output Virtualization (SR-IOV) with Linux* Containers", Networking Documentation, published Nov. 10, 2015, 17 pages.
TechLibrary-Junos OS-Storage Feature Guide, Understanding CoS Flow Control (Ethernet PAUSE and PFC), Nov. 15, 2017, 17 pages.
Wikipedia, "TCP congestion control", Retrieved from.
IEFT draft, "Network Service Header," Jul. 25, 2017, 2 pages.
"Congestion Aware Priority Flow Control in Data Center Networks"; Avci et al.; 2016 IFIP Networking Conference (IFIP Networking) and Workshops; May 2016 (Year: 2016).
First Office Action for U.S. Appl. No. 16/211,070, dated Dec. 17, 2021, 17 pages.

* cited by examiner

TECHNIQUES TO MANAGE DATA TRANSMISSIONS

TECHNICAL FIELD

Various examples are described herein that relate to techniques to reduction of network traffic congestion.

BACKGROUND

Data centers provide vast processing, storage, and networking resources to users. For example, smart phones or internet of things (IoT) devices can leverage data centers to perform computation, data storage, or data retrieval. Data centers are typically connected together using high speed networking devices such as network interfaces, switches, or routers. Congestion can occur whereby a receive port or queue of a data center receives more traffic than it can transfer for processing and the port or queue overflows. The precise cause of the congestion is difficult to ascertain as any transmitter to the receive port or queue or any links between the transmitter and the receiver could contribute to congestion.

DETAILED DESCRIPTION

Figure 1:
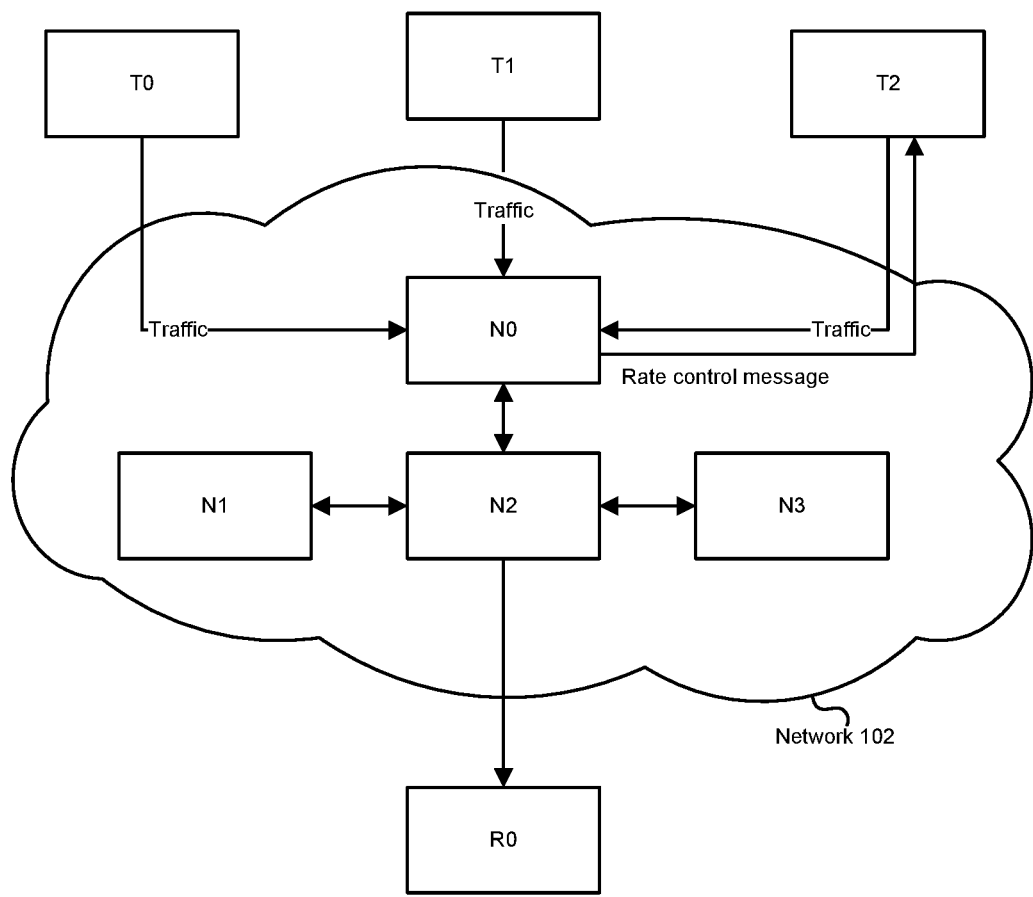
FIG. 1 depicts an example scenario of packet receipt and transmission.

FIG. 1 depicts an example of a known congestion control scheme. In this example, multiple transmitters T0-T2 transmit packets through a network 102. Network 102 includes network elements N0-N3. Network elements can be any of switch buffers, packet buffers, routers, or switches. In this example, network element N0 receives traffic from transmitters T0-T2. Element N0 experiences congestion such that it is not able to transfer received traffic to another network element or the destination in a timely manner that complies with relevant service level agreements (SLA) or quality of service (QoS). In a known congestion mechanism, N0 identifies a packet from T2 as a cause of congestion and transmits a rate control message solely to transmitter T2. This technique assumes that the rate control message will affect the transmitters that transmit more packets and accordingly provide for a large reduction in congestion. However, sending a rate control message only to T2 could cause T2 to reduce its transmit bandwidth to a level that results in failure to comply with its SLA requirements. Also, sending rate control message solely to T2 may not reduce congestion at N0. In this example, the source of the congestion could be attributed to any or all of T0, T1, or T2.

Figure 2:
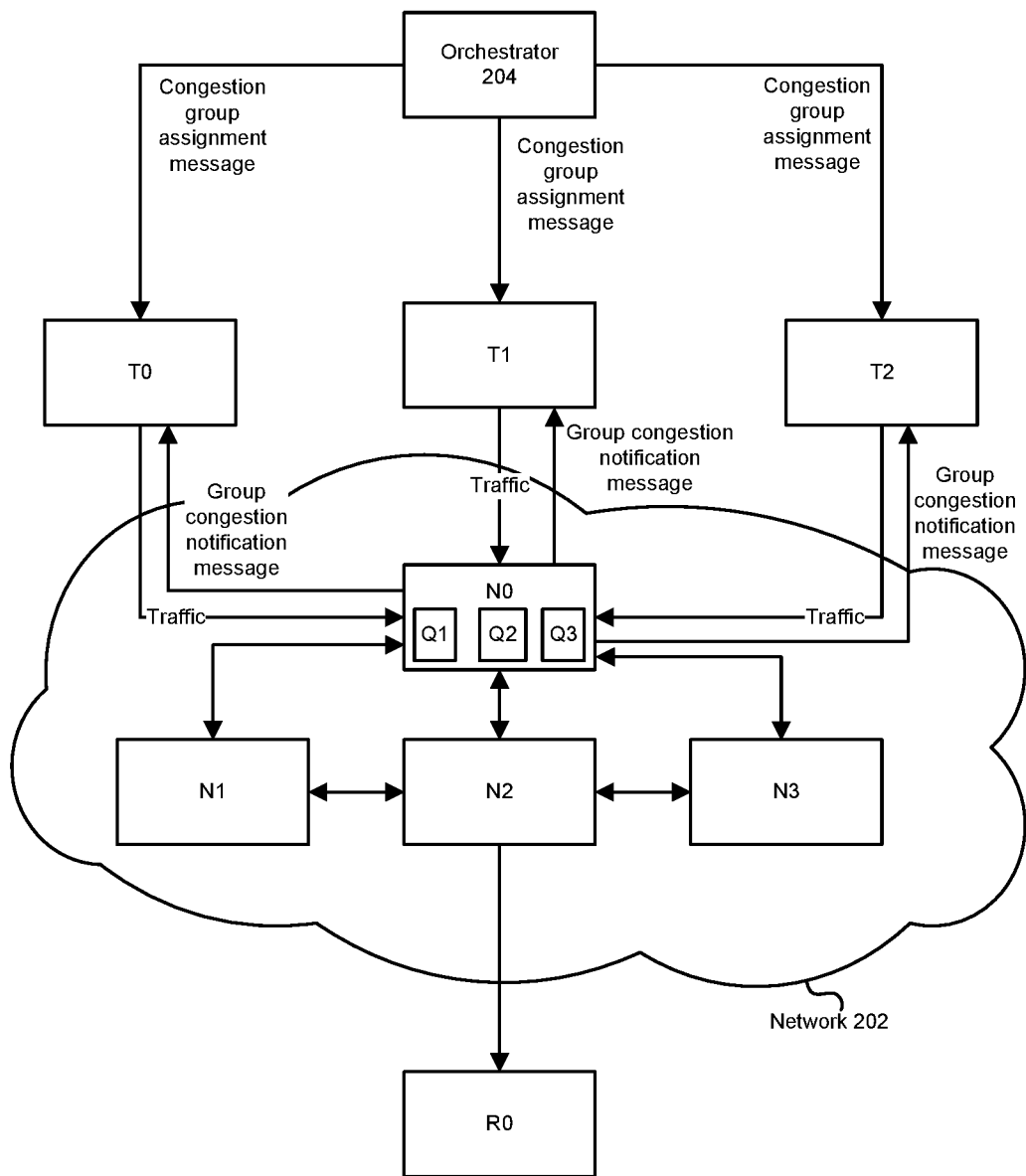
FIG. 2 depicts an example in which a network element transmits a group congestion control message to a group of transmitters.

In accordance with an embodiment, FIG. 2 depicts an example in which a network element N0 transmits a group congestion control message to a group of transmitters. In this example, network 202 can be any type of wired or wireless communications network. For example, network 202 can be a local area network (LAN) and/or a wide area network (WAN). Network 202 can support any protocol specifications including but not limited to: Ethernet, FibreChannel, Infiniband, Omni-Path, 3GPP LTE, ITU IMT-2020 (5G), and so forth.

A congestion group (CG) can be associated with a network packet buffer (e.g., either a switch packet buffer or a receive endpoint buffer). A switch's packet buffers may be arranged by input port, or output port, or both. In this example, switch NO may be an output buffered switch, in which each of its non-negligible packet buffers Q1, Q2, Q3 are associated with output ports coupled to peer switches N1, N2, N3. A Congestion Group, CG2, may be associated with output buffer Q2 that transmits packets to switch N2. Transmitters T0, T1 and T2 all transmit packets to receiver R0 via N0 and N2. Thus all three of these transmitters (T0, T1 and T2) are associated with CG2/Q2.

In response to assignment of transmitter T0 to transmit through an egress queue of network element N0, orchestrator 204 can assign transmitter T0 to a first congestion group (CG1). Similarly, in response to a connection being formed for transmitter T1 to transmit to an egress queue of network element N0, orchestrator 204 can assign transmitter T1 to the first congestion group (CG1). Likewise, in response for a connection being formed for transmitter T2 to transmit to an egress queue of network element N0, orchestrator 204 can assign transmitter T2 to the first congestion group (CG1). For example, network element N0 can route traffic from any one of or a combination of T0, T1, and T2 to any one of or a combination of egress queues Q1, Q2, and Q3. A transmitter can be a virtual machine (VM), application, or any software that is able to request transmission of data to an endpoint receiver.

The orchestrator assigns globally unique CG Identifiers (CGIDs) for every switch packet buffer and endpoint receive buffer in the network. In one embodiment, each switch or receive endpoint dynamically learns its buffers' CGIDs and their association with transmitters. At connection setup, the orchestrator provides the transmitter with the chain of CGIDs associated with the connection's path through the network. The transmitter includes this chain of CGIDs in packet headers when it transmits a data packet into the network. Each element in the chain of CGs includes the CGID and a Boolean value indicating the packet has passed through the relevant CG buffer in the network. The transmitter clears all Boolean values in the data packet's CG chain. When the data packet passes through a switch's packet buffer/CG, the CGID of that buffer is the first unset CG in the CG of the packet. Thus, the learning switch acquires the CGID of its buffer. Furthermore, the source address of the data packet indicates the transmitter of the packet. The switch adds this information to its dynamic table that associates its buffers with CGIDs and with transmitters that bear down on them. In another embodiment, the association of a switch or receiver endpoint buffer with a global CGID and the set of transmitters that bear down on it are statically configured by the orchestrator into the switch or receiver state at connection setup time. In that case, the transmitter still maintains a chain of CGIDs per connection, but it need not transmit this chain in each data packet.

Traffic from egress queues Q1, Q2, and Q3 are routed to respective network elements N1, N2, and N3. In this example, overflow results because network element N0 receives more packets at its ingress queue than the egress queue can egress to network element N2, or transfer in a timely manner. If a packet buffer/CG becomes congested, as defined by reaching or exceeding a configurable fill level, its switch or receiver issues a congestion control feedback packet to all transmitters associated with bearing down on the CG/buffer.

In an embodiment, network element N0 can send a group congestion notification message to a congestion group of more than one transmitter, as opposed to sending a rate control message to a single transmitter. The group congestion notification message can identify a congestion group identifier (e.g., CG1) and a header of a packet or packets that caused the overflow condition at an egress queue of network element N0. The group congestion notification message can comply with a User Datagram Protocol (UDP) protocol. A destination port specified in the group congestion notification message can be associated with a congestion message such that the specific port is to receive congestion messages. For example, a port on transmitters T0 to T2 can be allocated to receive congestion messages alone or along with other types of traffic.

Transmitters T0 to T2 receive the group congestion notification message and can reduce their transmit bandwidth. Rate control of transmitters injecting packets into the network can occur on a per-CG basis. Sending a congestion notification to a group allows fairness to be applied across transmitters instead of singling out a transmitter to perform a rate limiting. Instead, multiple transmitters in a congestion group can apply transmit rate limiting dynamically in accordance with their requirements. In an example, if congestion does not subside after a group congestion notification message is sent, then element N0 can send another group congestion notification message and the transmitters in the congestion group can reduce their peak transmit rate by the same percentage as in a prior reduction or by a greater percentage.

Figure 3A:
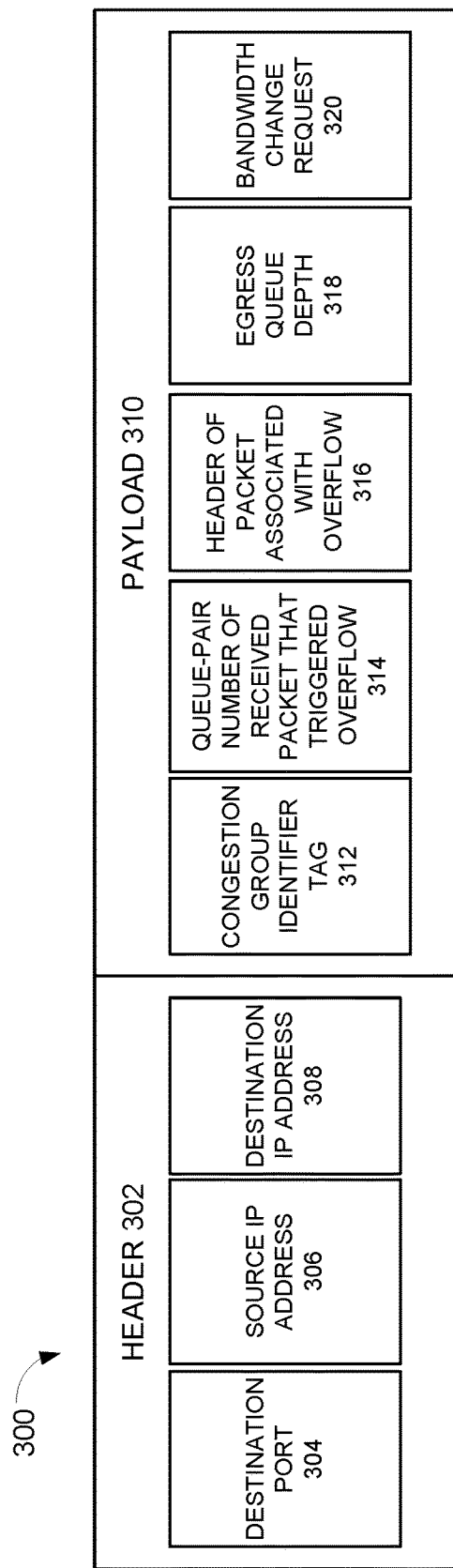
FIGS. 3A and B depict example formats of a group congestion notification message.

FIG. 3A depicts an example format of a group congestion notification message. Message 300 can be a UDP compliant packet and includes at least a header 302 and payload 310. Header 302 can be formed to include one or more of: destination port 304, source IP address 306, and destination IP address 308, among other fields that are not depicted. Destination port 304 can be a static port allocated for receipt of a group congestion control message at a destination. Source IP address 306 can be an IP address of a switch or receiver that forms and transmits the group congestion notification message. Destination IP address 308 can be an IP address of a relevant transmitter or other networking element that is to receive the group congestion control message. Accordingly, destination IP address 308 can be unique and specific for each recipient of the group congestion control message.

Payload 310 can be formed to include one or more of: a congestion group identifier tag 312, queue-pair number of the packet that triggered overflow 314, header of packet associated with overflow 316, egress queue depth 318 indicating queue depth of congested egress queue, and bandwidth change request 320. In an example, payload 310 can include the congestion group identifier tag 312 and either egress queue depth 318 or bandwidth change request 320.

In an example, congestion group identifier tag 312 can include congestion group identifier CGid. Congestion group identifier CGid can be a unique congestion group identifier for a switch or receive endpoint queue.

Queue-pair number of the packet that triggered overflow 314 can be an identifier of the queue-transmitter connection assigned by an orchestrator, where the queue is the congested queue and the packet that caused the queue to become congested was sent over the queue-pair. Header of packet associated with overflow 316 can include a portion of a header of a packet that caused a queue to reach or exceed a threshold level. The threshold level can be a level that is associated with congestion. Egress queue depth 318 can be the actual depth of the queue that experienced congestion. Bandwidth change request 320 can be a request to reduce the bandwidth by a percentage or a request to cap bandwidth to a specified value.

Figure 3B:
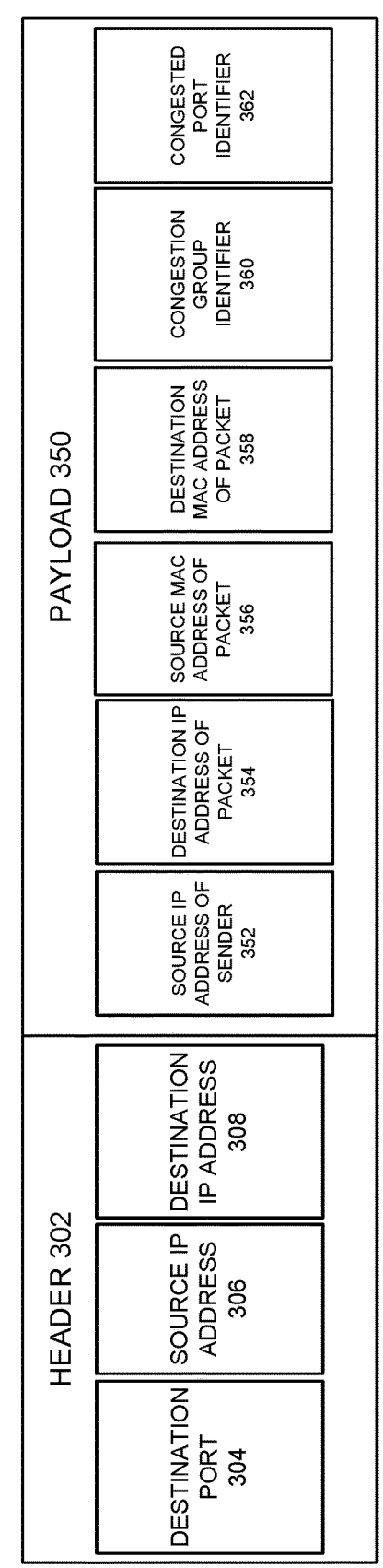

FIG. 3B depicts an example format of a group congestion notification message. Message 300 can be a UDP compliant packet and includes at least a header 302 and payload 310. Payload 350 can include one or more of: a source IP address of a sender of the packet that caused congestion in an egress queue 352, destination IP of the packet that caused congestion in an egress queue 354, source MAC address of the packet that caused congestion in an egress queue 356, destination MAC address of the packet that caused congestion in an egress queue 358, congestion group identifier number 360, and congested port number 362.

Figure 4:
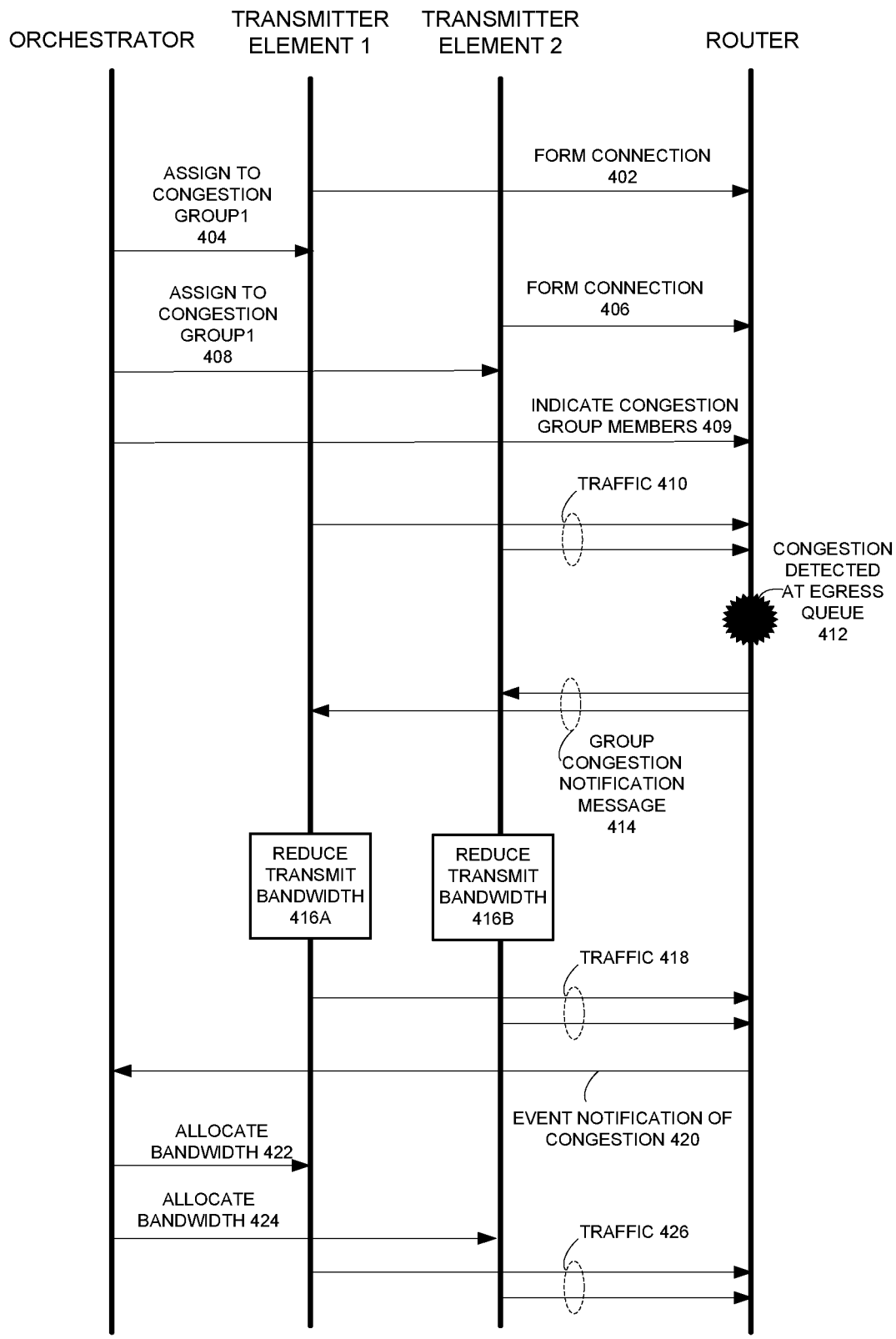
FIG. 4 is a diagram that shows congestion management using a group congestion message.

FIG. 4 is a diagram that shows congestion management using a group congestion message. At 402, transmitter element 1 can form a connection with an egress queue of a router such that the transmitter element 1 can transmit packets to the router and use that egress queue to transfer packets. At 404, orchestrator can assign transmitter element 1 to a congestion group 1. At 406, transmitter element 2 can form a connection with an egress queue such that the transmitter element 2 can transmit packets to the egress queue. At 408, orchestrator can assign transmitter element 2 to a congestion group 1. As or after a connection between a transmitter and egress queue is formed, the orchestrator configures each one of the routers, switches, and other network elements in the network with a list of end point transmitters associated with the congestion group. For example, at 409, orchestrator can inform router that transmitter elements 1 and 2 are part of a congestion group 1. Router can store or access a remote look-up-table that associates source IP or MAC addresses of packets (or other packet characteristics) transmitted from transmitter elements 1 and 2 with congestion group 1.

In another example, 404 and 408 can occur prior to both of 402 and 406 whereby an orchestrator can assign transmitter elements 1 and 2 to congestion group 1 prior to transmitter elements 1 and 2 forming a connection with an egress queue.

At 410, transmitter elements 1 and 2 transmit traffic to the router. Each transmitter can attach a congestion group (CG) tag in each transmitted packet to identify a congestion group that a transmitter is associated with. As another example, a transmitter can form a transmit packet to include a chain of CG identifier tags of each switch or other network element encountered by the packet to the receiver. The receiver of the chain of CG identifier tags can use the CG identifier tags to identify a congestion group number that is attributed to a cause of the congestion. As another example, a transmitter can send a CG tag in a first packet sent to the egress queue and the receiver can form a look-up-table to identify the CG of the transmitter of the first packet. Characteristics of the first tag such as source IP address can be used to associate a CG with a transmitter. In an example, orchestrator can configure receiver with a look-up-table that associates a transmitter with CG and the transmitter does not include a CG tag in transmitted packets.

At 412, congestion is detected at the egress queue of the router. Congestion can be detected in a variety of ways. For example, packet collisions at an egress queue of the router can be detected at the router. In an example, an egress queue of a router can transmit packets to a network element. If more than a threshold percentage of an egress queue of the router (e.g., a transmit port of a switch that sends packets to an end-point) is used but less than a threshold percentage of an ingress queue of the network element is used, then a root cause for congestion is the egress queue of the router. Congestion at that egress queue can be identified by the router or using the orchestrator, or both.

At 414, a transmitter associated with the router forms and transmits a group congestion notification message to all transmitters in the congestion group capable to transmit to the egress queue (e.g., congestion group 1). Some examples of group congestion notification message are described herein.

At 416A and 416B, transmitter 1 and 2 reduce their transmit bandwidth. Transmitter elements 1 and 2 can each reduce their prior transmit rate by a pre-configured percentage. The rate reduction can be the same percentage for transmitter elements in the congestion group. For example, a pre-configured percentage can be 10%. The reduction in transmit rate can increase as a number of congestion messages received increases. For example, after receipt of a first congestion message, the reduction can be 10% but if a second congestion message is received within a time window from the first congestion message, then the second reduction can be 15%, and so forth. Peak transmit rates for transmitters 1 and 2 can be set to the reduced peak transmit rate. In some examples, transmitter 1 can reduce its transmit rate by a different percentage than applied by transmitter 2.

In an example, the transmitter elements 1 and 2 are not permitted to increase their transmit rate until a threshold period of time has passed with no congestion messages received or until the orchestrator resets their peak transmit rate. If a threshold period of time passes, transmitter element 1 or 2 can increase its rate at a ramp up to their peak allocated rate. In some examples, data transmission techniques described herein can be used to regulate any increase in transmit rate.

At 418, transmitter elements 1 and 2 transmit traffic to the egress queue but at a reduced transmit rate.

At 420, the router can send an event notification message to orchestrator to indicate that the router has transmitted a congestion group notification message to a congestion group. The notification message can include the congestion group number identifier. In response, orchestrator can determine an adjusted peak transmit rate for each of transmitter elements 1 and 2. Orchestrator can monitor telemetry information related to network traffic such as counters of packets sent to the egress queue and counters of packets dropped by the egress queue. Orchestrator can infer a new peak transmit rate for transmitter elements 1 and 2 based on those counters. For example, peak transmit rates of transmitter elements 1 and 2 can be selected based for example on service level agreement (SLA) requirements and adjusted to be below or above the rates set at 416A and B. The orchestrator may reconfigure the peak bandwidth rate among the transmitters to increase or decrease peak transmit rates.

At 422, the orchestrator can allocate a peak transmit rate for transmitter 1. At 424, the orchestrator can allocate a peak transmit rate for transmitter 2. The peak transmit rate can be the same, higher, or lower than the peak transmit rate set at 416A and 416B. At 426, transmitter elements 1 and 2 transmit traffic to the egress queue but according to a peak transmit rate adjusted by the orchestrator.

In an example, instead of an orchestrator informing each switch of congestion group identifiers for transmitter endpoints, one or more switches can learn congestion group identifiers of transmitter endpoints. A transmitter endpoint can transmit a data packet that includes a chain of traversed congestion group identifiers. The data packet can include a hop count that allows a switch to determine which congestion group identifier to associate with each network node step or hop. For example, a first congestion group identifier can be associated with a first hop, and a second congestion group identifier in the chain is associated with the second hop. The switch can learn all congestion group identifiers from the chain and associated the identifiers with source IP addresses (e.g., transmitter endpoints). The switch can build its own table of congestion group identifiers instead of or in addition to receiving contents of the table from an orchestrator.

Figure 5A:
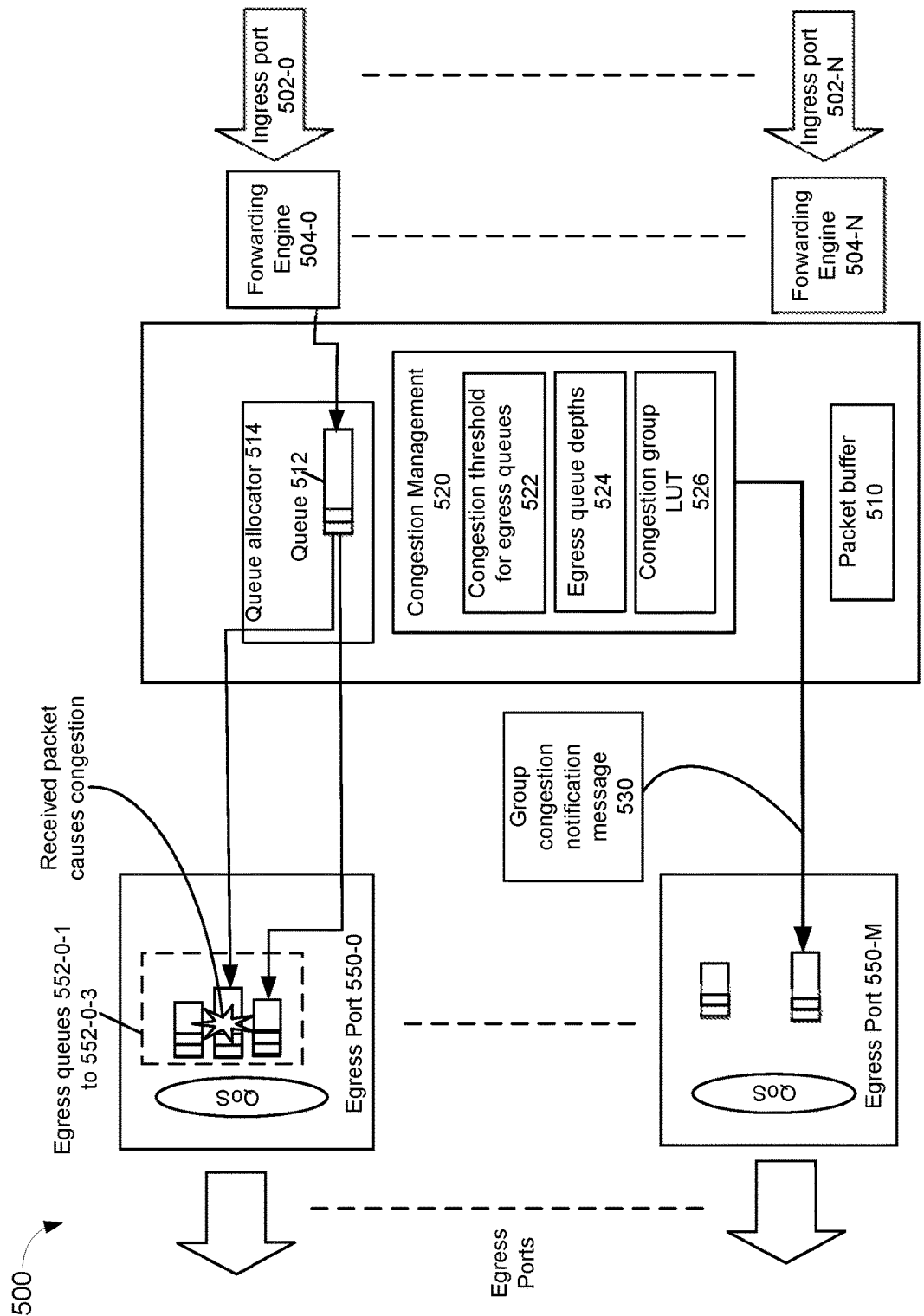
FIG. 5A depicts an example block diagram showing a device with component(s) that initiate and transmit congestion group notification message to transmitters.

FIG. 5A depicts an example block diagram showing a system that can initiate and transmit a congestion group notification message. System 500 can be used by a switch, router, or receiver endpoint. System 500 can include multiple ingress ports 502-0 to 502-N and each ingress port is capable of receiving packets from another device such as an endpoint transmitter, switch or router. Ingress ports 502-0 to 502-N can each have an associated forwarding engine 504-0 to 504-N. Forwarding engine 504-0 to 504-N can determine which egress port 550-0 to 550-N to forward a received packet to based on characteristics of the packet. For example, forwarding engine 504-0 can forward a packet received at ingress port 502-0 to egress port 550-2 based on characteristics of the received packet header such as destination IP address or destination MAC address. In an embodiment, forwarding engines 504-0 to 504-N can determine which egress queue associated with an egress port to enqueue a reference to the received packet.

In some example, one or both of queue allocator 514 and queue 512 are not used and instead forwarding engine 504-0 to 504-N cause pointers to packets or portions of packet header and/or body to be written directly to an egress queue.

Packet buffer 510 can store header and/or payload portions of packets received from the forwarding engines 504-0 to 504-N. Queue 512 can store pointers to portions of packets in packet buffer 510. Queue allocator 514 can allocate pointers in queue 512 to an egress queue associated with an egress port. For example, an egress port 550-0 can have one or more associated egress packet queues 552-0-1 to 552-0-3. Each egress packet queue can be associated with a quality of service (QoS) for example and transmission from the egress packet queue is provisioned based on QoS requirements.

Congestion management 520 can determine if any egress queue is congested. For example, an egress queue can be congested if more than a threshold percentage of the egress queue is filled. For example, congestion management 520 determines that an egress queue 552-0-2 receives a reference to a packet and addition of a reference to the packet in the egress queue 552-0-2 would cross a threshold for that egress queue 552-0-2. Congestion management system 520 can determine if an egress queue is congested in a variety of manners. For example, congestion management system 520 can monitor all routing of packets from ingress ports to egress port queues and determine if any routing would cause a congestion threshold to be exceeded. Congestion management system 520 can track queue depth of each egress queue 552-0 to 552-M. For example, congestion management system 520 can providing a routing feature whereby forwarding engine 504 forwards a received packet to congestion management system 520 and congestion management system 520 routes the received packet to an egress queue, instead of or in addition to forwarding engine 504 performing a routing of a received packet to an egress queue.

Congestion management system 520 can track congestion thresholds for each egress queue 522 and egress queue depths 524 for all egress ports. In an example, an egress port 550 can inform congestion management system 520 of its egress queue depth(s) before, during, or after a packet transmission. Congestion management system 520 can determine if any egress queue is in an overflow state by determining if a queue depth exceeds a threshold.

Congestion management system 520 can form a group congestion notification message 530 in response to any egress queue 552 that is in a congested state based on its queue depth. Congestion management system 520 can identify a received packet placed in an egress queue that causes the queue depth to reach a congested state. Congestion management system 520 can use properties of that received packet to determine a congestion group associated with the congestion and that could potentially cause the congestion in the egress queue. For example, the received packet can include an indicator of a congestion group number in its header or payload. Congestion management system 520 can use the congestion group number to look-up one or more destination IP or MAC addresses to use to transmit a group congestion notification message to. For example, a congestion group look-up-table (LUT) 526 can be used to associate congestion group numbers with a destination IP or MAC addresses.

In some examples, instead of a received packet including a congestion group number identifier, congestion management system 520 can use a look-up-table to associate a source IP or source MAC address with a group of transmitters, routers, or switches.

Congestion management system 520 can form a group congestion notification message 530 and transmit, broadcast, or unicast the message 530 to a group of transmitters, routers, or switches. The header or payload of congestion message 530 can include one or more of: congested egress queue depth, source IP address of device that transmitted the packet that caused congestion of an egress queue, destination IP address of the packet that caused congestion of an egress queue, source MAC address the packet that caused congestion of an egress queue, destination MAC address the packet that caused congestion of an egress queue, congestion group identifier the packet that caused congestion of an egress queue, or congested egress port number. Other of group congestion message are described herein.

Figure 5B:
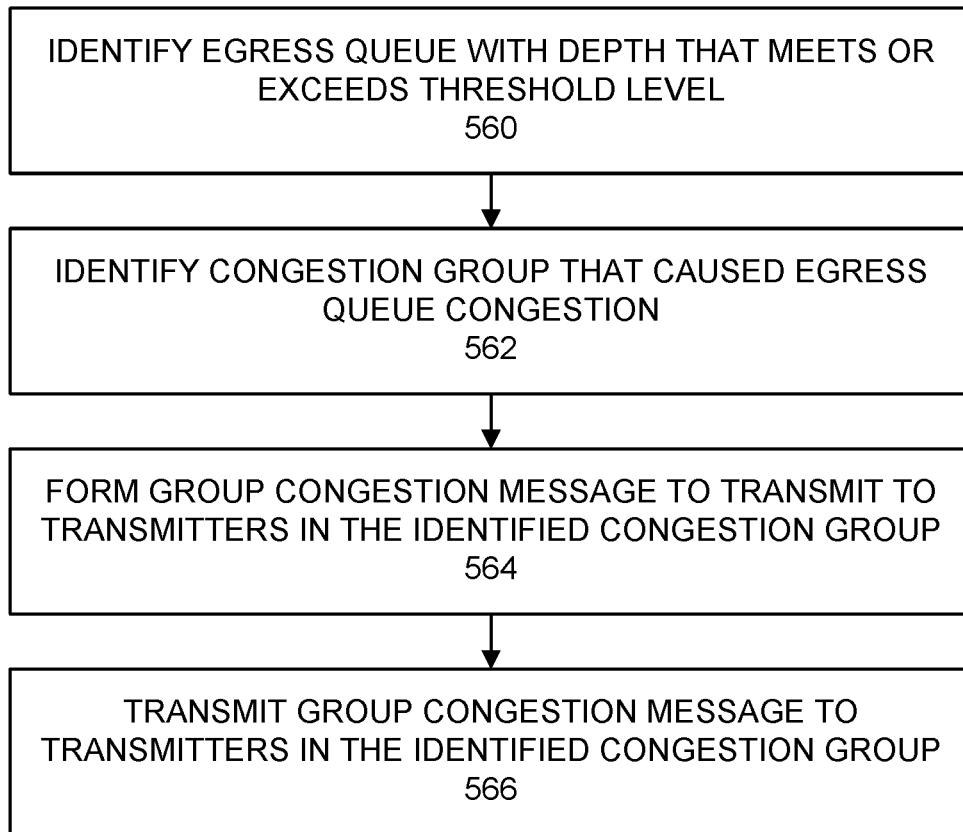
FIG. 5B shows an example flow diagram that can be used to identify a congested egress queue and to send a group congestion message to a group of transmitters, switches, or routers.

FIG. 5B shows an example flow diagram that can be used to identify a congested egress queue and to send a group congestion message to a group of transmitters, switches, or routers. At 560, an egress queue with a depth that meets or exceeds a threshold level is identified. For example, routing a received packet at an ingress port to an egress queue associated with an egress port can cause the egress queue to reach the threshold level. A variety of egress queues can be used, each with different threshold levels. Tracking of queue depth can take place in a variety of manners, including: an egress port reporting queue depth of each egress queue, an ingress port reporting routing of a packet to an egress queue, or monitoring queue depth in connection with routing packets from an ingress port to an egress queue.

At 562, a congestion group that caused congestion of the egress queue can be identified. For example, a received packet that caused the egress queue to have a depth that meets or exceeds the threshold level can be identified as a cause of congestion in the egress queue. Characteristics of the received packet can be examined and a congestion group determined based on the characteristics. For example, the received packet may include a congestion group identifier that indicates a congestion group number of a transmitter of the packet. In another example, a source IP address, source MAC address, MPLS tag, or other characteristic of the received packet can be examined and a look-up-table consulted to identify a congestion group number based on the characteristic.

At 564, a group congestion message can be formed to be sent to transmitters in the congestion group. For example, the group congestion notification message can be a UDP compliant packet encapsulated in an IP compliant packet. The congestion notification message can be addressed to all transmitters in the congestion group that are part of the congestion group of the device that transmitted the packet that caused congestion of an egress queue. The addresses can be determined using an address look-up-table based on the congestion group identified in the received packet or the source IP address of device that transmitted the packet that caused congestion of an egress queue. The payload of the group congestion notification message can include one or more of: congested egress queue depth, source IP address of device that transmitted the packet that caused congestion of an egress queue, destination IP address of the packet that caused congestion of an egress queue, source MAC address the packet that caused congestion of an egress queue, destination MAC address the packet that caused congestion of an egress queue, congestion group identifier the packet that caused congestion of an egress queue, or congested egress port number. At 566, the group congestion message can be sent to transmitters in the congestion group.

A transmitter that receives the group congestion message can determine if it is a potential cause of the congestion by review of the packet (or portion thereof) that caused a congestion condition that is included in the group congestion notification message. In a case where the transmitter transmitted the packet that caused a congestion condition that is included in the group congestion notification message, the transmitter can reduce its transmit rate by a larger percentage than a default transmit rate reduction percentage applied by transmitters in a congestion group that receive a group congestion notification message.

Data Transmission Ramp

In some examples, a transmission speed of a network can be so fast that even with the use of an individual or group congestion message, transmitters may not receive the message and react in time by reducing transmitted packets before congestion increases at an egress queue. A network can transfer data so rapidly that in the event of congestion, large amounts of transmitted traffic can arrive at a congested node before and after a congestion message is received by a transmitter.

Various embodiments provide for a ramp feature whereby data transmission from a transmit queue is not permitted at a peak transmit rate after the queue was idle or asleep but instead the data transmission rate ramps up to the peak transmit rate at a prescribed rate. The ramp can be implemented in the transmit scheduler of a network interface. When a transmit queue is woken from a sleep/empty state to a non-empty state, the transmit queue is not immediately allocated its transmit peak rate. The transmit scheduler will increase the transmit queue's transmit rate over time at a rate of increase that depends on the amount of data in the transmit queue and whether any congestion messages were received.

Various embodiments provide for managing data transmission from transmit queues by use of tokens. A transmit queue has an associated token count that represents an amount of data permitted to be transmitted from the transmit queue. After a transmit queue is permitted to transmit data, a packet can be formed up to a maximum packet size and the packet is transmitted. The transmit queue's token count is debited by a size of the transmitted data. The next time a transmit queue is permitted to request to transmit data depends on whether the transmit queue has remaining data after its data transmission and a token balance after its data transmission. A transmit queue is placed into a sleep state if it has a negative token balance after its data transmission. A time to when the transmit queue is permitted to wake-up and request a data transmission, if there is data to be transmitted, depends on its token replenishment rate and the extent of its negative token balance.

Figure 6:
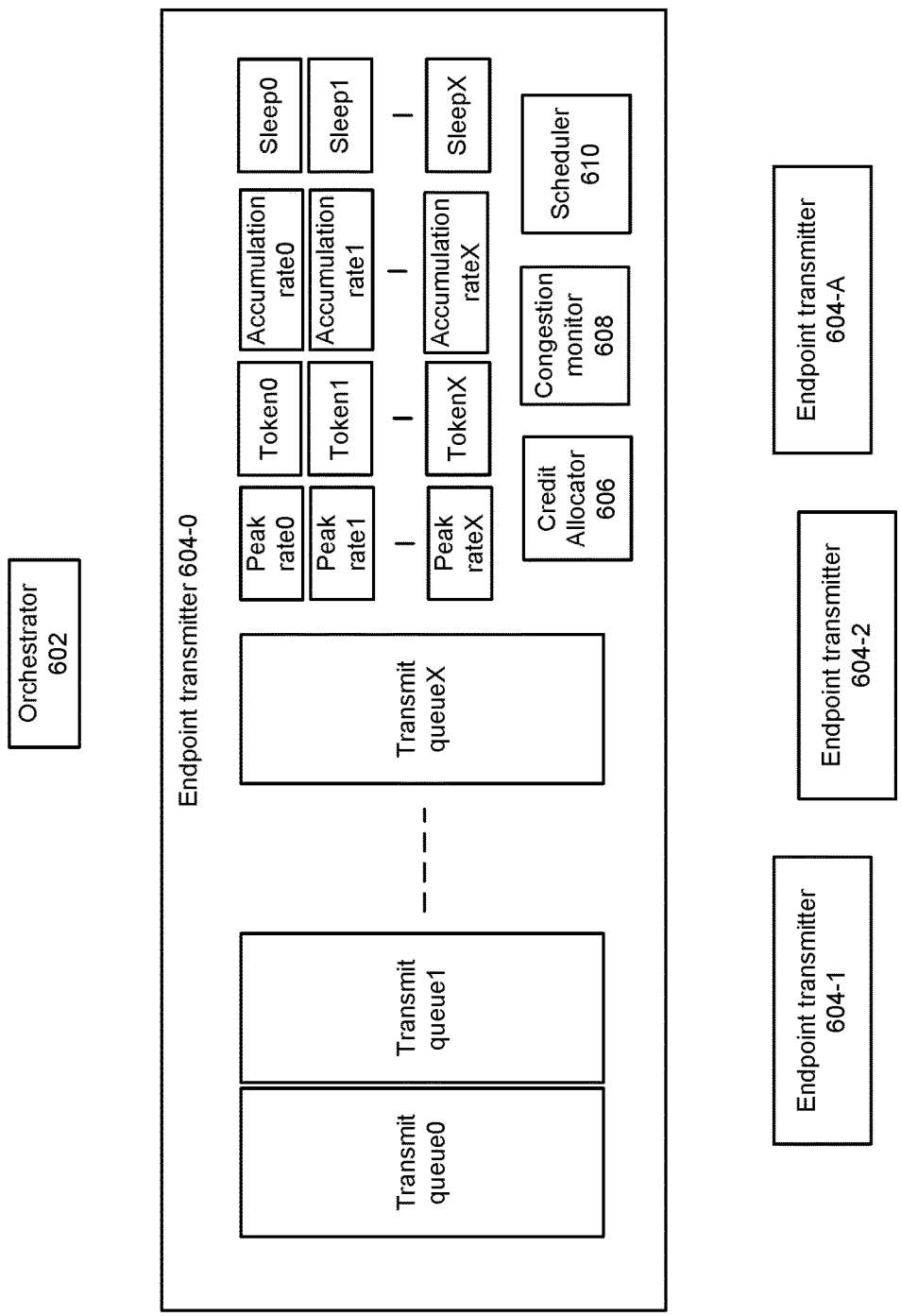
FIG. 6 depicts an example block diagram of a system that can be used by an endpoint transmitter to rate limit transmission of packets.

FIG. 6 depicts an example block diagram of a system that can be used by an endpoint transmitter to rate limit transmission of packets. Endpoint transmitters 604-1 to 604-A can adjust their peak transmit rate in a similar manner as that of transmitter 604-0. For example, endpoint transmitter 604-0 can utilize multiple transmit queues 0 to X (where X is an integer) to store references to data to be transmitted. A transmit queue can be allocated in memory of endpoint transmitter 604-0 and include data available for transmission or pointers to data so that packets with at least some of the data can be assembled for transmission by endpoint transmitter 604-0.

Each transmit queue 0 to X can be associated with a respective peak transmit rate 0 to X (shown as Peak rate0 to Peak rateX), respective accumulated token count 0 to X (shown as Token0 to TokenX), respective token accumulation rate 0 to X (shown as Accumulation rate0 to Accumulation rateX), and respective sleep registers Sleep0 to SleepX.

A transmit rate of a transmit queue can depend on a number of accumulated tokens for the transmit queue. Each accumulated token can correspond to a fraction of a transmit peak rate associated with the queue. Credit allocator 606 can allocate token(s) to a token accumulator (Token0 to TokenX) for each queue (Transmit queue0 to queueX) at a replenishment time interval. The rate at which credit allocator 606 allocates tokens to each token accumulator (Token0 to TokenX) at a replenishment time interval is specified by respective Accumulation rate0 to Accumulation rateX. Credit allocator 606 can provide for ramping of transmission bit rate as opposed to each transmit queue being able to transmit at its transmit peak rate (TPR). Data associated with a transmit queue is not permitted to be transmitted until the transmit queue accumulates at least a zero or positive token balance. A transmit queue is put into a sleep state until credit allocator 606 allocates token(s) to provide for at least a zero or positive token balance. Fields Sleep0 to SleepX indicate a time when respective transmit queue0 to transmit queueX are to wake up from a sleep state, if any is in a sleep state.

The transmission bit-rate permitted for a transmit queue can be determined in the following manner:

Transmit peak rate*(accumulated token count/peak token count), where (accumulated token count/peak token count) is not to exceed 1.

For example, the transmission bit-rate of a transmit queue0 is based on accumulated tokens in accumulated token count 0 (shown as Token0) and bounded by a peak transmit rate specified in Peak rate0. If a peak transmit rate is 50 Gbps and there are 5 accumulated tokens and the peak token count is 10, then the transmit bit-rate associated to queue0 is 25 Gbps.

When the transmit queue is empty (at setup time or when the queue is dormant and all associated packets were transmitted), a ramped transmission rate can occur. At ramped transmission rate start, the token replenishment quantum is set to a fraction (e.g., $\frac{1}{16}^{th}$) of a default replenishment rate. At a replenishment interval, the accumulated tokens are incremented so that the transmit rate could increase by a fixed fraction of the TPR, until either the transmit rate either reaches the associated TPR or the queue receives a congestion control message. If the latter occurs, the replenishment quantum is reduced so that the transmit rate is reduced by a fixed fraction of TPR and the accumulated tokens can be reduced as well to reduce a transmit rate of the transmit queue associated with remote congestion.

For example, orchestrator 602 configures a maximum transmission bit-rate for each transmit queue or group of queues (e.g., a virtual machine or group of virtual machines) of end point transmitters 604-0 to 604-A. For transmitter 604-0, orchestrator 602 can set Peak rate0 to Peak rateX. For example, orchestrator 602 configures a maximum transmission bit-rate for a queue or group of queues at or near the bit-rate of the lowest bandwidth link in the path from transmit to receive endpoints. If a transmit endpoint uses a network to transmit to a receive endpoint, the lowest bandwidth link can be a lowest bandwidth path traversable by a transmitted packet to the endpoint destination. Orchestrator 602 can program a peak rate for each queue to indicate such lowest bandwidth path. For example, if a transmit queue0 uses a connection to a destination queue that provides several 100 Gbps links but also uses a 50 Gbps link with the destination queue, then the Peak rate0 is set to 50 Gpbs.

Congestion monitor 608 can monitor for any congestion message such as a group congestion notification sent to a group of devices (e.g., endpoint transmitters 604-0 to 604-A) or a congestion indication sent solely to transmitter 604-0. Congestion monitor 608 can inspect the congestion indication and reduce a token count of a transmit queue associated with the congestion (e.g., the congestion indication identifies the specific transmit queue as a source of a packet that caused congestion) and also reduce a token accumulation rate for the transmit queue. If no particular transmit queue is identified, congestion monitor 608 can reduce a token count for all transmit queues to reduce a peak transmit rate from all transmit queues and reduce a token accumulation rate for all transmit queues.

Scheduler 610 can select which transmit queue is permitted to transmit data. A variety of selection techniques such as but not limited to a weighted fair queueing (WFQ) approach. In some examples, scheduler 610 does not select any transmit queue that is indicated to be in a sleep state.

Note that techniques described herein can be used for any transceiver or transmitter even if it an intermediary network device that receives and forwards packets to another device or endpoint.

Figure 7:
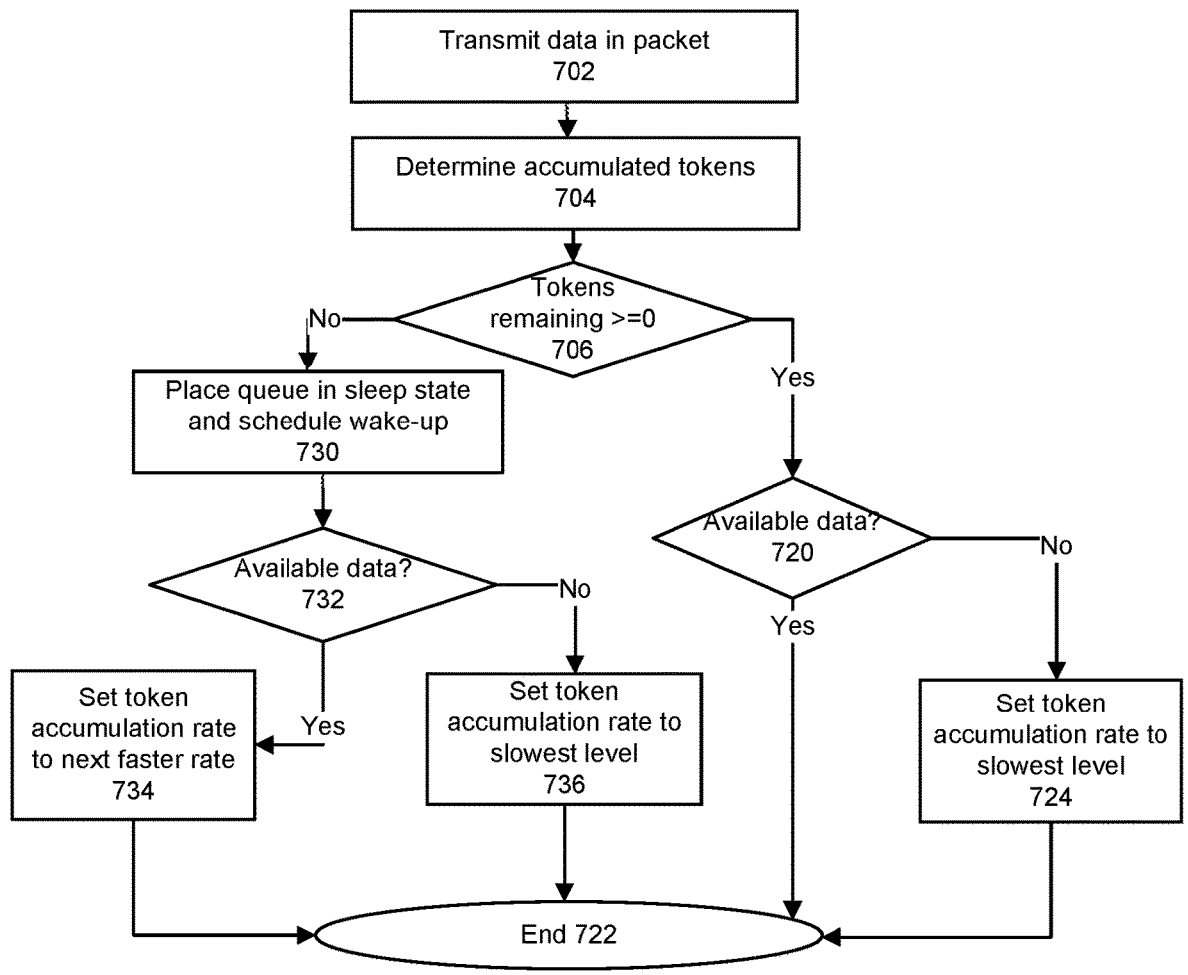
FIG. 7 depicts an example process that can be used to manage a transmission rate of data associated with a transmit queue.

FIG. 7 depicts an example process that can be used to manage an amount of data permitted to be transmitted by managing sleep states and wake times of transmit queues. A network interface can be programmed or configured to manage the amount of data permitted to be transmitted. At 702, data from a transmit queue is permitted to be transmitted, up to a maximum packet size for the transmitter. At 704, a determination is made of the total number of accumulated tokens for the transmit queue. Accumulated tokens can represent an amount of data allowed to be transmitted, for example in kilobytes or megabytes. For example, a number of bytes transmitted in 702 using the transmit packet can be subtracted from the accumulated token count for the transmit queue. For example, if an accumulated token count is 1000 and 500 megabytes were transmitted, then 500 is subtracted from the accumulated token count of 1000 for the transmit queue, leaving 500 tokens remaining. At 706, a determination is made whether the accumulated tokens for the queue is zero or positive. If the accumulated tokens for the queue is zero or positive, then 720 follows.

At 720, a determination is made as to whether the transmit queue has other data to transmit. If the transmit queue has other data to transmit, then at 722, the process ends and subsequently, the transmit queue can request a scheduler to transmit data. However, if the transmit queue does not have other data to transmit, then at 724, the token accumulation rate is set to a lowest level so that tokens for the transmit queue accumulate at the slowest available rate.

At 706, if the accumulated tokens for the queue, after adjustment for the packet transmission, is negative, then 730 follows. At 730, the transmit queue is placed in a sleep state and a wake-up time is scheduled for the transmit queue. The wake-up time is scheduled at a time that the accumulated tokens reach zero from a negative state. For example, if 2 tokens are added every microsecond and the accumulated tokens is −100, then the queue can be scheduled to wake-up in 50 microseconds.

At 732, a determination is made as to whether the transmit queue has other data to transmit (e.g., the transmit queue has any associated transmit data). If the transmit queue has other data to transmit, then at 734, the rate of token accumulation is increased to a next higher level so that tokens accumulate at a higher rate than a rate used to determine the wake-up time. Adjusting the replenishment rate to a next level can allow the transmit queue to wake with a positive number of accumulated tokens. However, at 732, if a determination is made that the transmit queue currently has no other data to transmit (e.g., the queue is empty after the data transmission), then at 736, the token replenishment rate is set to a lowest level. Adjusting the replenishment rate to a lower level can cause the transmit queue to wake with a negative number of accumulated tokens as the accumulation rate decreased from its original level that was used to set a wake-up time. At 722, the process ends. Subsequently, the transmit queue can request a scheduler to transmit data, as the need arises.

Figure 8:
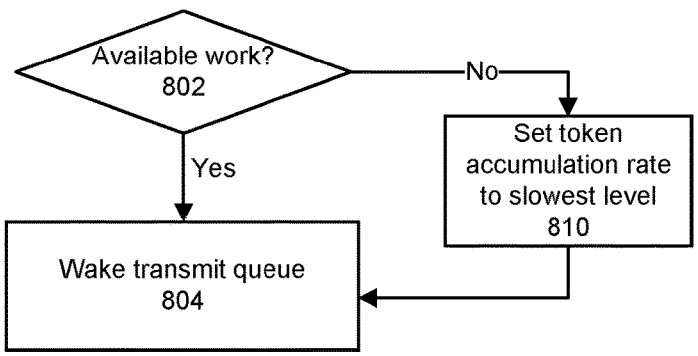
FIG. 8 depicts an example process that can be applied after a transmit queue wakes up from a sleep state.

FIG. 8 depicts an example process that can be applied when a transmit queue is scheduled to wake up from a sleep state. At 802, a determination is made as to whether the transmit queue has other data to transmit. If the transmit queue has data to transmit, then at 804, the transmit queue is woken up and allowed to query the scheduler and request data transmission. Subsequently, the awoken transmit queue can request a scheduler to transmit data (e.g., up to a maximum packet size). However, if the transmit queue does not have other data to transmit, then at 810, the token accumulation rate is set to a lowest level so that tokens for the transmit queue accumulate at the slowest available rate. For example, this slowest rate can be less than a rate of accumulation used to determine when to wake up the transmit queue. Thereafter, the awoken transmit queue can wait for available data to transmit and request scheduling of data transmission.

Figure 9A:
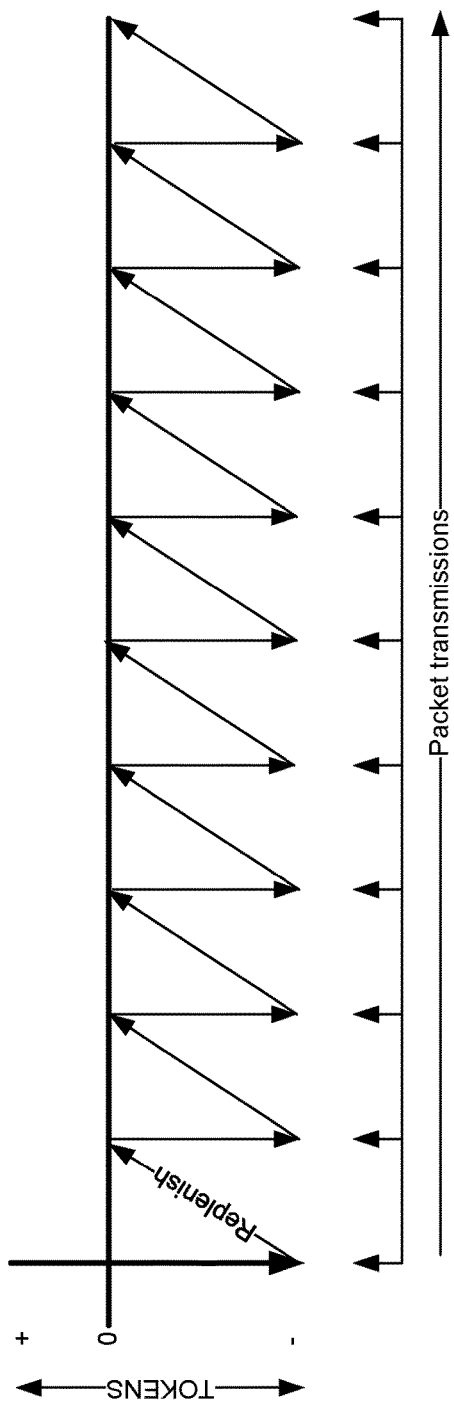
FIG. 9A depicts an example of replenishment of tokens after a data transmission.

FIG. 9A depicts an example of replenishment of tokens after a data transmission. After a transmission of data from a queue, the accumulated tokens are reduced by the data size in the transmitted packet. In this example, the replenishment rate is the same after each packet transmission and the accumulated tokens are replenished to zero after each transmission at the same rate. The replenishment rate can be the maximum rate allowed after a packet transmission. In this example, there is no condition triggered to reduce the token accumulation rate such as negative token balance after a data transmission or no data available to transmit from the transmit queue after a data transmission or after waking up.

Figure 9B:
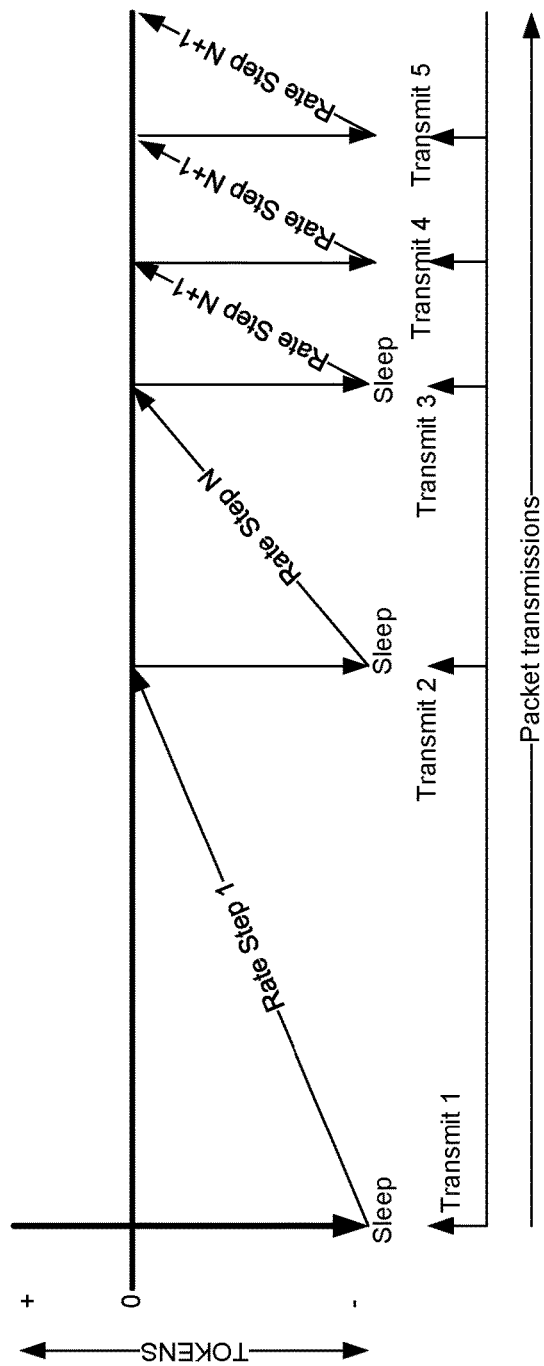
FIG. 9B shows an example of a replenishment of tokens after a data transmission with varying token refresh rates.

FIG. 9B shows an example of a replenishment of tokens after a data transmission with varying token refresh rates. For example, after a packet transmission of Transmit 1, there are negative accumulated tokens and there is no additional data to transmit. Accordingly, the transmit queue is placed in a sleep state and the replenishment rate is set at rate step 1, which is the lowest replenishment rate. After the transmit queue awakens from sleep and the scheduler permits the transmit queue to be a source of transmitted data, then accumulated tokens are debited by the size of the transmitted data in Transmit 2 and there are negative accumulated tokens but there is data available to transmit in the transmit queue. The replenishment rate is set to Step N, which is a faster rate than step 1. The replenishment rate can be increased to Step N because the transmit queue has data to transmit even after Transmit 2.

After the transmit queue awakens from sleep and the scheduler permits the transmit queue to be a source of transmitted data, then accumulated tokens are debited by the size of the transmitted data in Transmit 3. After Transmit 3, there are negative accumulated tokens and the transmit queue is placed into a sleep state but the transmit queue has data to transmit. Accordingly, tokens are accumulated at the Step N+1, which is a higher replenishment rate than Step N.

Thereafter, after the queue is awoken and when permitted to transmit, transmission of the data will take place.

Transmits 4 and 5 can both be situations where a positive or zero token balance result after a data transmission and there is data available to transmit.

Figure 9C:
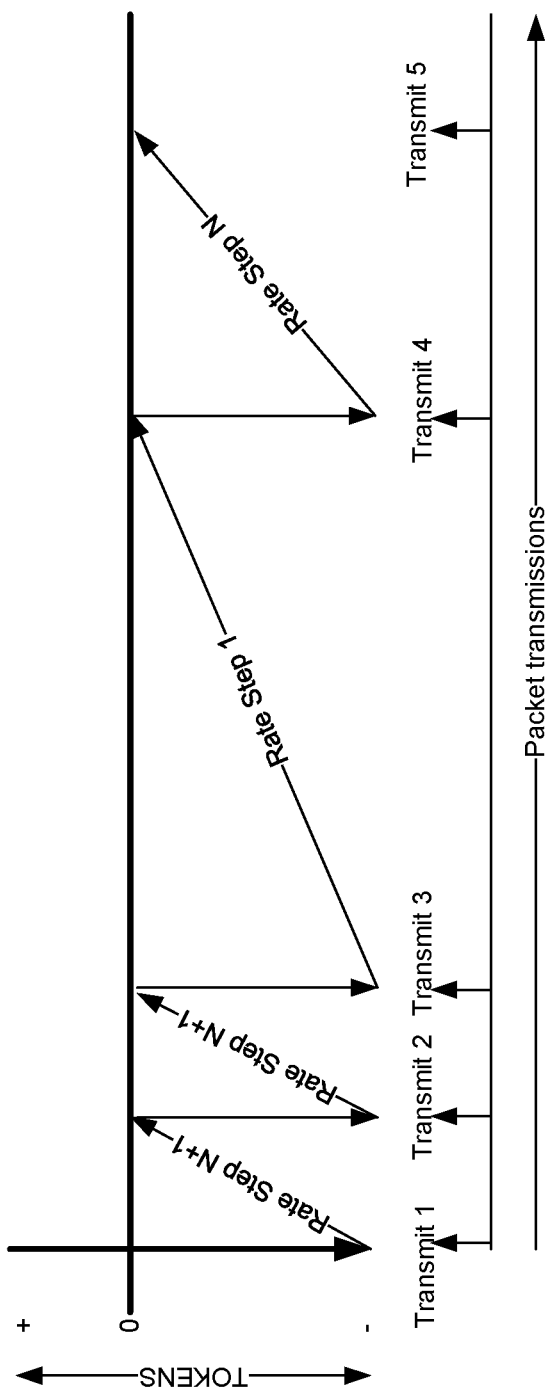
FIG. 9C depicts an example of token replenishment rate adjustment.

FIG. 9C depicts an example of token replenishment rate adjustment. After the transmit queue awakens from sleep and the scheduler permits the transmit queue to be a source of transmitted data, then accumulated tokens are debited by the size of the transmitted data in Transmit 1. After Transmit 1, the accumulated tokens are more than zero and there is available data to transmit from the transmit queue. The replenishment rate is maintained at rate Step N+1. Step N+1 can represent the highest replenishment rate. After the transmit queue awakens from sleep and the scheduler permits the transmit queue to be a source of transmitted data, then accumulated tokens are debited by the size of the transmitted data in Transmit 2. After Transmit 2, the accumulated tokens are more than zero and there is available data to transmit from the transmit queue, and the replenishment rate is maintained at rate Step N+1.

After the transmit queue awakens from sleep and the scheduler permits the transmit queue to be a source of transmitted data, then accumulated tokens are debited by the size of the transmitted data in Transmit 3. After Transmit 3, the accumulate tokens is negative and there is no available data to transmit from the transmit queue, and the replenishment rate is set to the lowest replenishment rate, Step 1.

After the transmit queue awakens from sleep and the scheduler permits the transmit queue to be a source of transmitted data, then accumulated tokens are debited by the size of the transmitted data in Transmit 4. The accumulated token count becomes negative, but there is available data to transmit from the transmit queue. The replenishment rate is increased to rate Step N, which is a next step faster than Step 1.

Figure 10A:
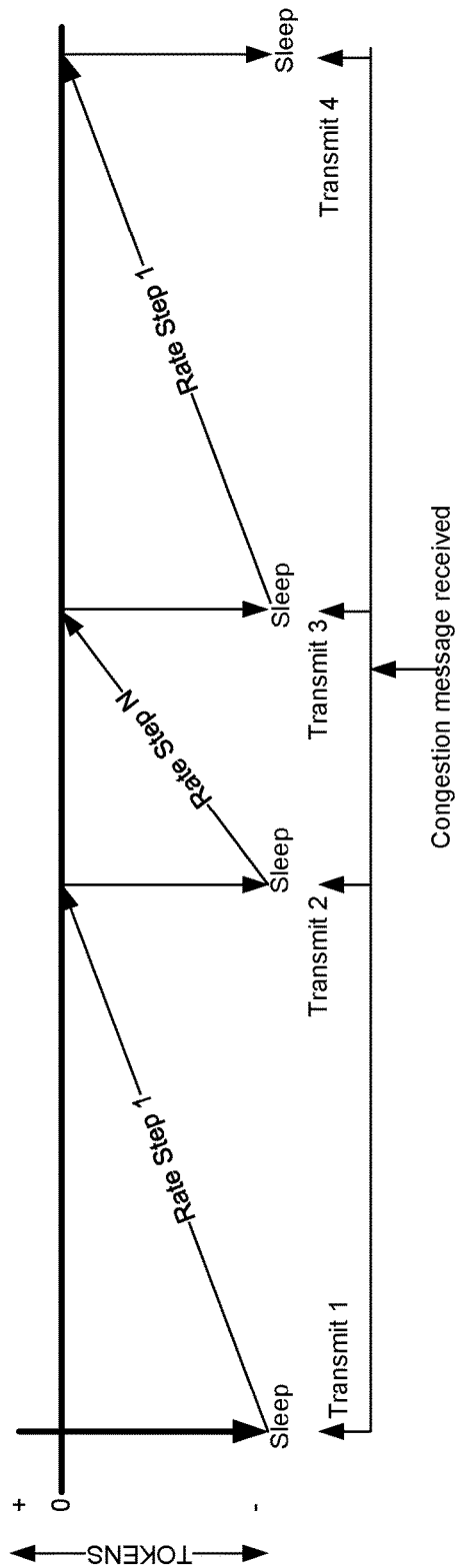
FIG. 10A depicts an example in which a received congestion message modifies a replenishment rate to decrease in response to receipt of a congestion message.

FIG. 10A depicts an example in which a received congestion message modifies a token replenishment rate to decrease in response to receipt of a congestion message. After the transmit queue awakens from sleep and the scheduler permits the transmit queue to be a source of transmitted data, then accumulated tokens are debited by the size of the transmitted data in Transmit 1. After Transmit 1, there is no available data to transmit from the transmit queue and the replenishment rate is set to rate Step 1. After the transmit queue awakens from sleep and the scheduler permits the transmit queue to be a source of transmitted data, then accumulated tokens are debited by the size of the transmitted data in Transmit 2. After Transmit 2, the accumulated token count is negative but there is available data to transmit from the transmit queue. The replenishment rate is increased to a next step, Step N. The transmit queue is put in a sleep state.

During the sleep state, a congestion message is received. A congestion message can be a message indicating congestion is detected at a receive port or receive queue and the congestion message can be sent to one or more transmitters. The congestion message identifies the transmit queue as a source of a packet that lead to congestion. Receipt of a congestion message can cause the replenishment rate to reset to a lowest level, Step 1, after a transmission of data in Transmit 3.

Figure 10B:
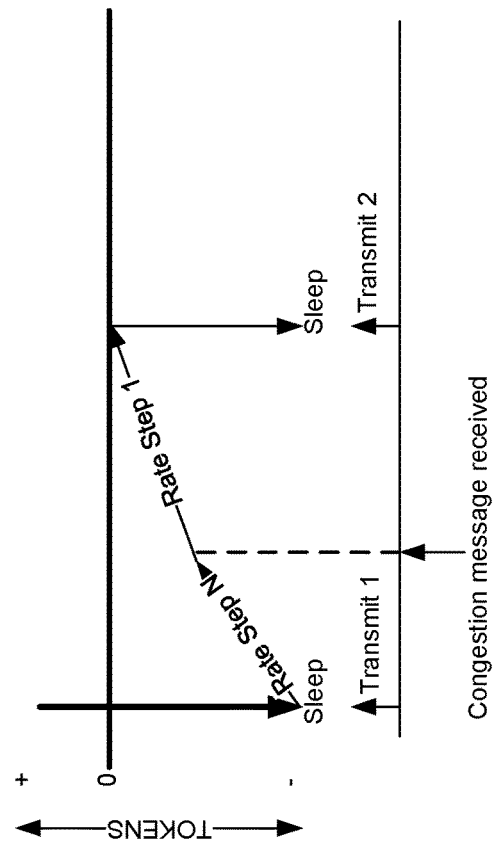
FIG. 10B depicts another example in which a received congestion message modifies a replenishment rate.

FIG. 10B depicts another example in which a received congestion message modifies a replenishment rate. In this example, in response to receipt of a congestion message, the replenishment rate is changed from step N to the lowest rate, Step 1, during the transmit queue being in a sleep state and even before the accumulated tokens reach zero or the transmit queue wakes from sleep. The transmit queue will awake from sleep with fewer tokens that expected (negative amount) because the replenishment rate is decreased during the sleep state. After the transmit queue awakens from sleep and the scheduler permits the transmit queue to be a source of transmitted data, then accumulated tokens are debited by the size of the transmitted data in Transmit 2. In some examples, in response to receiving a congestion message directed to a sleep-state transmit queue, a wake time of the sleep-state transmit queue that receives a congestion message can be delayed further so that the transmit queue is not to wake-up until the accumulated tokens returns to zero.

Figure 11:
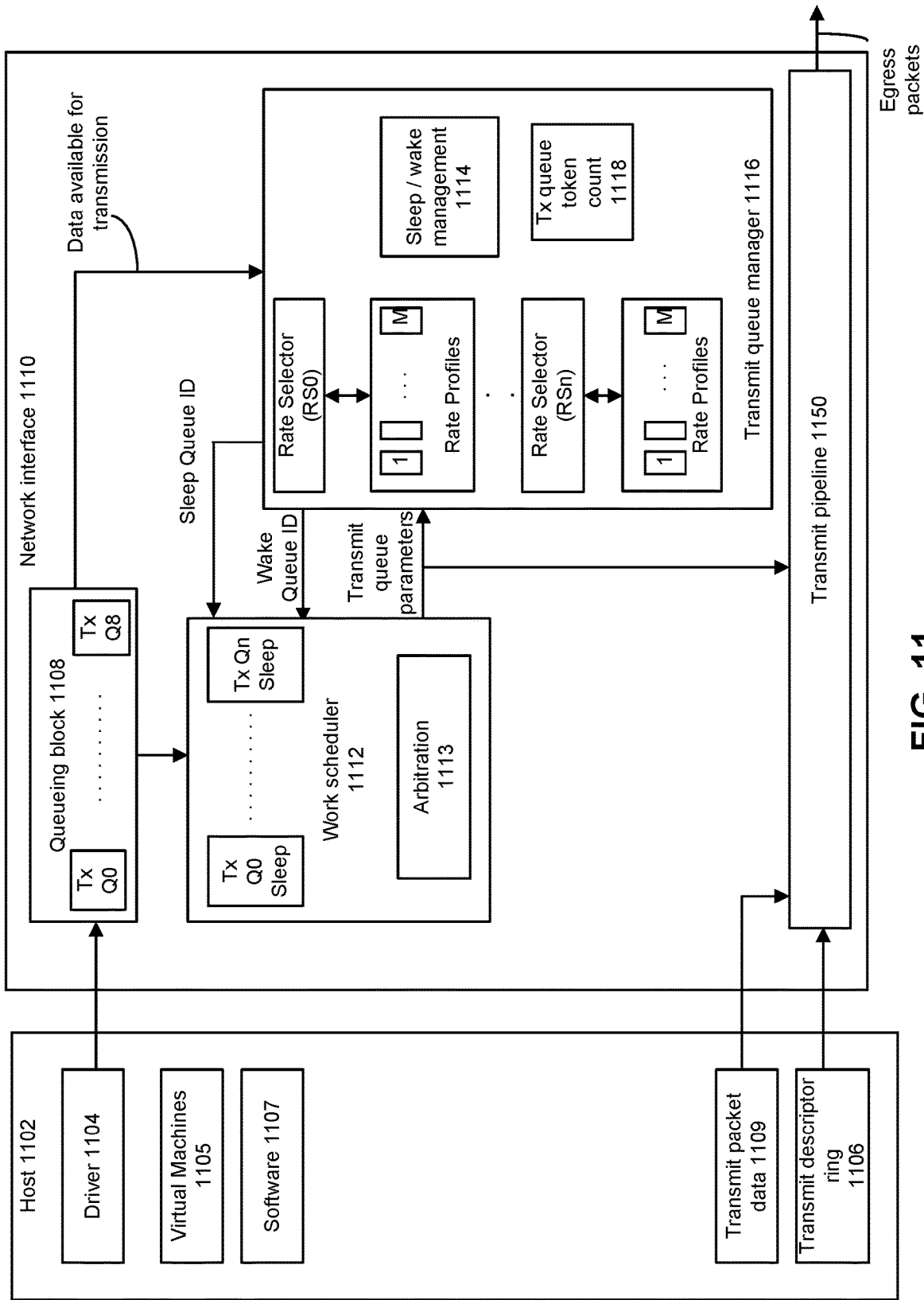
FIG. 11 depicts a block diagram of a system that can be used to manage a data transmit rate from one or more queues.

FIG. 11 depicts a block diagram of a system that can be used to manage an amount of data transmitted from one or more queues. The system can include a host 1102 communicatively coupled to network interface 1110 using an interface. For example, the interface (not depicted) can be PCI Express compatible, Intel® On-Chip System Fabric (IOSF) compliant, or other standards or proprietary formats. Host 1102 can include a processor, memory, storage, and device interconnects that are not depicted. Host 1102 executes a driver 1104. At the request of an application or other software (e.g., virtual machine 1105 or software 1107) executing on host 1102, driver 1104 can issue a request (e.g., doorbell request) to queueing block 1108 to transmit data using a particular transmit queue among TxQ0 to TxQn. Queueing block 1108 can decide which transmit queue request is to be provided to work scheduler 1112. A variety of selection criteria can be used to select a transmit queue request including but not limited to arbitration, queue priority, round robin, and so forth.

Work scheduler 1112 can decide which transmit queue, identified by queueing block 1108, is permitted to transmit next. For example, work scheduler 1112 can use arbitration logic 1113 to determine which transmit queue is permitted to transmit next. Arbitration logic 1113 can apply a weighted fair queueing (WFQ) approach or other techniques to select a transmit queue. In some examples, arbitration logic 1113 does not select or consider any transmit queue that is indicated to be in a sleep state. States TxQ0 sleep to TxQn sleep indicate whether respective transmit queue TxQ0 to TxQn is in a sleep state or not.

Work scheduler 1112 can respond to a request to place a transmit queue in a sleep state via signal Sleep Queue ID from sleep/wake management system 1114 by placing the transmit queue in a sleep state. Conversely, work scheduler 1112 can respond to a request to wake up a transmit queue from a sleep state via signal Wake Queue ID from sleep/wake management system 1114 by changing a sleep state status in one or more of TxQ0 Sleep to TxQn Sleep, thereby allowing the transmit queue to be considered by arbitration logic 1113 to request transmission of data.

Work scheduler 1112 can indicate to transmit queue manager 1116 the transmit queue that is selected to transmit next using a transmit queue identifier number. Work scheduler 1112 can also inform transmit pipeline 1150 of the selected transmit queue by providing transmit queue parameters including at least a transmit queue identifier number and also indicate an amount of data to transmit.

Transmit queue manager 1116 can use Tx queue token count 1118 to store a count of tokens accumulated for each of transmit queues TxQ0 to TxQn. Transmit queue manager 1116 can use rate selector RS0 to RSn determine a rate of token accumulation for respective transmit queues TxQ0 to TxQn. Transmit queue manager 1116 can use rate selector RS0 to RSn to select a token accumulation rate based on an applied rate profile 1 to M. For example, rate profile 1 can correspond to a slowest token accumulation rate whereas rate profile M can correspond to a fastest permitted token accumulation rate for a transmit queue. A rate of token accumulation controls when a transmit queue can wake up from a sleep state and request a subsequent data transmission. An amount of accumulated tokens can represent an amount of data permitted to be transmitted from a transmit queue, in some cases.

Transmit queue manager 1116 can receive an indication of whether a transmit queue that requests transmission has available data to transmit after the data transmission via signal "Data available for transmission." Rate selector RS0 to RSn can select a rate profile based on whether a transmit queue has available data to be transmitted after data transmission and a token balance after the data transmission. If after a data transmission, a transmit queue has a positive token balance and remaining data to transmit, then the transmit queue is kept in a wake state and permitted to request transmission. If after a data transmission, a transmit queue has a positive token balance and no data to transmit, then the transmit queue is kept in a wake state and permitted to request transmission but its token accumulation rate is set to a slowest level. If after a data transmission, a queue has a zero or negative token balance and available data to transmit, then the transmit queue is placed in a sleep state and is able to accumulate tokens at a next higher rate. If after a data transmission, a transmit queue has a zero or negative token balance and no available data to transmit, then the transmit queue is placed in a sleep state and is able to accumulate tokens at a slowest rate. For example, techniques described with respect to FIGS. 7 and 8 can be used to select an applied token accumulation rate profile for a transmit queue.

Sleep/wake management system 1114 can manage whether a transmit queue is in a wake state or a sleep state. After a packet transmission using data from or associated with a transmit queue, if an accumulated token count for a transmit queue is zero or negative, then transmit queue manager 1116 places that transmit queue in a sleep state and tokens accumulate at its current accumulation rate. Transmit queue manager 1116 schedules a wake-up using sleep/wake management system 1114 based on when the tokens are expected to reach zero. When a queue is to enter a sleep state, sleep/wake management system 1114 can inform work scheduler 1112 to place a transmit queue in a sleep state using signal Sleep Queue ID. When a queue is scheduled for wake-up, sleep/wake management system 1114 can inform work scheduler 1112 to wake-up a transmit queue using signal Wake Queue ID.

Network interface 1110 can use transmit pipeline 1150 to transmit one or more packets with data associated with the transmit queue selected to be permitted to transmit data. Transmit pipeline 1150 can receive an indication of the selected transmit queue parameters (e.g., transmit queue selected to transmit) from work scheduler 1112 and transmit pipeline 1150 can perform transmit descriptor management and packet processing for packet transmission. To perform a packet transmission using data associated with a transmit queue that is selected for data transmission by work scheduler 1112, transmit pipeline 1150 can fetch transmit descriptors and packet data from respective transmit descriptor ring 1106 and transmit packet data 1109 in host device 1102. Transmit pipeline 1150 can process descriptors from transmit descriptor rings 1106 to cause transfer of data from host 1102 (or transfer of pointers to data in memory of host 1102) to an associated transmit queue in network interface 1110. Transmit descriptors can include data segments that enable the network interface to track transmit packet locations in the host memory. A variety of descriptor formats can be used.

Transmit pipeline 1150 can provide for packetizing and transmitting egress packets via an egress port according to applicable network protocol standards. For example, any networking standard can be applied including: Ethernet, FibreChannel, Infiniband, Omni-Path, 3GPP LTE, ITU IMT-2020 (5G), and so forth. Note that packet receipt and processing is not shown, but network interface 1110 can provide that capability. Transmit pipeline 1150 can provide transmit completion notification to host 1102.

Figure 12:
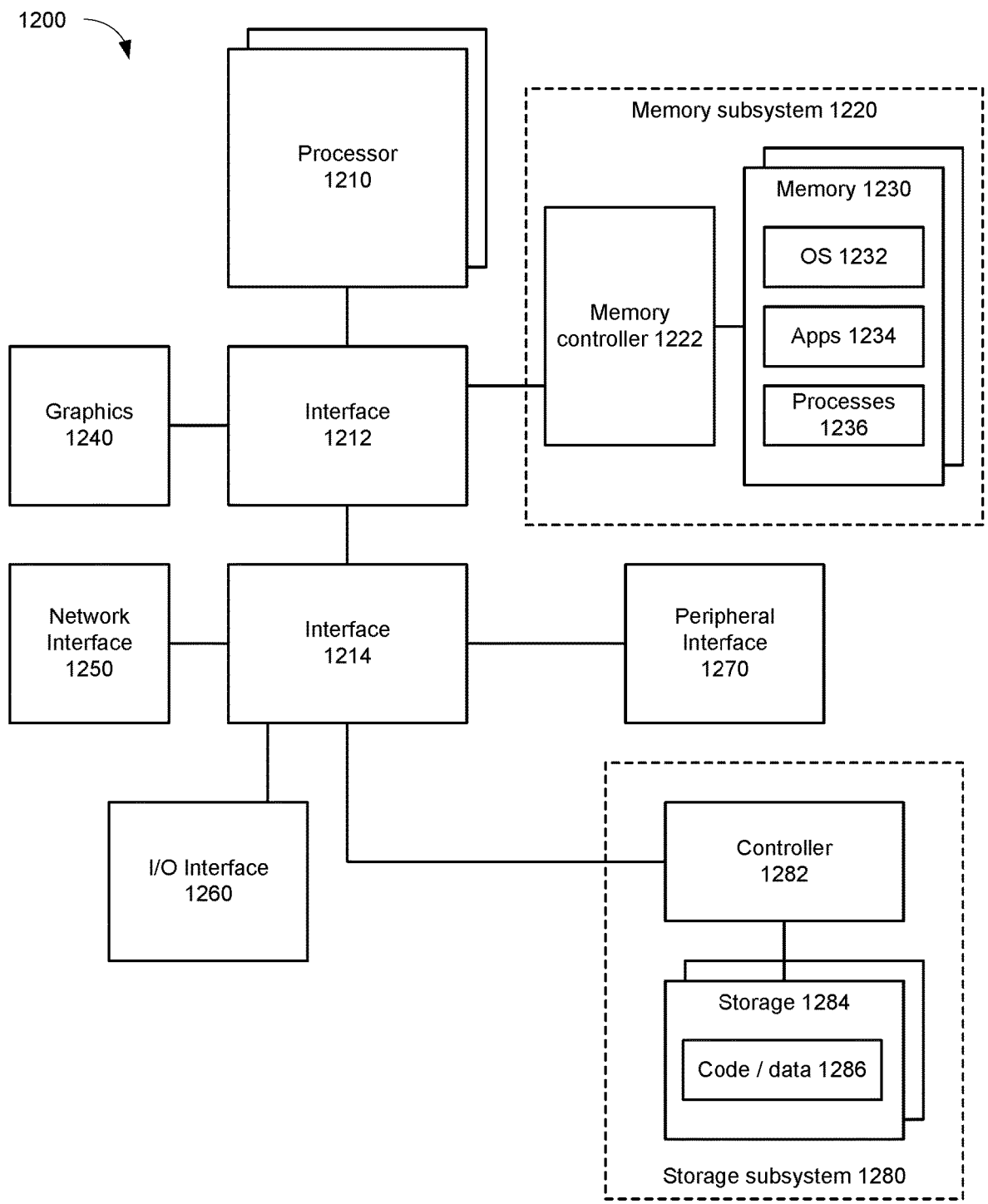
FIG. 12 is a block diagram of an example of a computing system.

FIG. 12 is a block diagram of an example of a computing system. System 1200 represents a computing device in accordance with any example herein, and can be a laptop computer, a desktop computer, a tablet computer, a server, group of servers, a gaming or entertainment control system, a scanner, copier, printer, routing or switching device, embedded computing device, a smartphone, a wearable device, an internet-of-things device or other electronic device.

System 1200 includes processor 1210, which provides processing, operation management, and execution of instructions for system 1200. Processor 1210 can include any type of microprocessor, central processing unit (CPU), graphics processing unit (GPU), processing core, or other processing hardware to provide processing for system 1200, or a combination of processors. Processor 1210 controls the overall operation of system 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1200 includes interface 1212 coupled to processor 1210, which can represent a higher speed interface or a high throughput interface for system components that needs higher bandwidth connections, such as memory subsystem 1220 or graphics interface components 1240. Interface 1212 represents an interface circuit, which can be a standalone component or integrated onto a processor die. Where present, graphics interface 1240 interfaces to graphics components for providing a visual display to a user of system 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

Memory subsystem 1220 represents the main memory of system 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in system 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for system 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that system 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 13124 bus.

In one example, system 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides system 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a remote device, which can include sending data stored in memory. Network interface 1250 can receive data from a remote device, which can include storing received data into memory.

In one example, system 1200 includes one or more input/output (I/O) interface(s) 1260. I/O interface 1260 can include one or more interface components through which a user interacts with system 1200 (e.g., audio, alphanumeric, tactile/touch, or other interfacing). Peripheral interface 1270 can include any hardware interface not specifically mentioned above. Peripherals refer generally to devices that connect dependently to system 1200. A dependent connection is one where system 1200 provides the software platform or hardware platform or both on which operation executes, and with which a user interacts.

In one example, system 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (i.e., the value is retained despite interruption of power to system 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to system 1200). In one example, storage subsystem 1280 includes controller 1282 to interface with storage 1284. In one example controller 1282 is a physical part of interface 1214 or processor 1210 or can include circuits or logic in both processor 1210 and interface 1214.

A power source (not depicted) provides power to the components of system 1200. More specifically, power source typically interfaces to one or multiple power supplies in system 1200 to provide power to the components of system 1200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1200 can be implemented using interconnected compute sleds of processors, memories, storages, network interfaces, and other components. High speed interconnects can be used such as PCIe, Ethernet, or optical interconnects (or a combination thereof).

Figure 13:
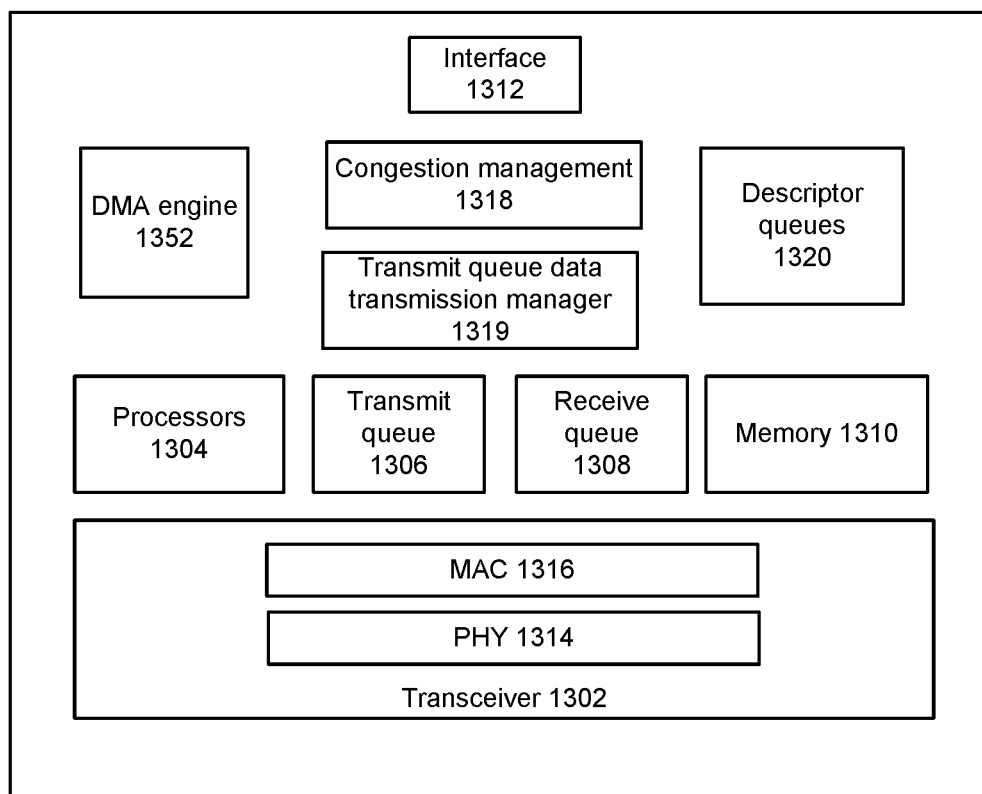
FIG. 13 is a block diagram of an example network interface.

FIG. 13 depicts an example network interface. Network interface 1300 can include transceiver 1302, processors 1304, transmit queue 1306, receive queue 1308, memory 1310, and bus interface 1312, and DMA engine 1352. Transceiver 1302 can be capable of receiving and transmitting packets in conformance with the applicable protocols such as Ethernet as described in IEEE 802.3, although other protocols may be used. Transceiver 1302 can receive and transmit packets from and to a network via a network medium (not depicted). Transceiver 1302 can include PHY circuitry 1314 and media access control (MAC) circuitry 1316. PHY circuitry 1314 can include encoding and decoding circuitry (not shown) to encode and decode data packets. MAC circuitry 1316 can be configured to assemble data to be transmitted into packets, that include destination and source addresses along with network control information and error detection hash values. Processors 1304 can be any processor, core, graphics processing unit (GPU), or other programmable hardware device that allow programming of network interface 1300. For example, processors 1304 can execute congestion management system 1318 that can identify congestion in an egress queue and cause a group congestion notification message to be sent to transmitters or devices in the congestion group associated with the packet that caused the congestion. Processors 1304 can execute transmit queue data transmission manager system 1319 that can determine when to place a transmit queue in a sleep state, when to wake a transmit queue, a rate of accrual of data transmission credits, and a peak transmit rate, in accordance with embodiments described herein.

Memory 1310 can be any type of volatile or non-volatile memory device and can store any queue or instructions used to program network interface 1300. Transmit queue 1306 can include data or references to data for transmission by network interface. Receive queue 1308 can include data or references to data that was received by network interface from a network. Descriptor queues 1320 can include descriptors that reference data or packets in transmit queue 1306 or receive queue 1308. Bus interface 1312 can provide an interface with host device (not depicted). For example, bus interface 1312 can be compatible with PCI, PCI Express, PCI-x, Serial ATA, and/or USB compatible interface (although other interconnection standards may be used).

Direct memory access (DMA) engine 1352 can copy a packet header, packet payload, and/or descriptor directly from host memory to the network interface or vice versa, instead of copying the packet to an intermediate buffer at the host and then using another copy operation from the intermediate buffer to the destination buffer.

Figure 14:
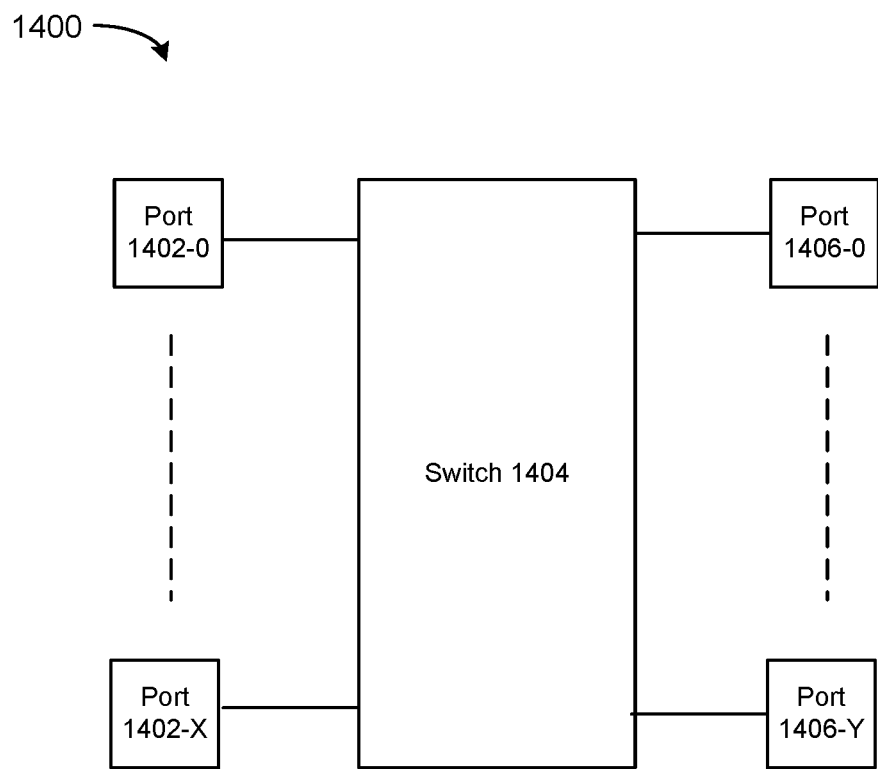
FIG. 14 depicts an example switch that can be used in embodiments.

FIG. 14 depicts an example switch that can be used in embodiments. Switch 1404 can route packets or frames of any format or in accordance with any specification from any port 1402-0 to 1402-X to any of ports 1406-0 to 1406-Y (or vice versa). Any of ports 1402-0 to 1402-X can be connected to a network of one or more interconnected devices. Similarly, any of ports 1406-0 to 1406-X can be connected to a network of one or more interconnected devices. Switch 1404 can decide which port to transfer packets or frames to using a table that maps packet characteristics with an associated output port. In addition, switch 1404 can perform packet replication for forwarding of a packet or frame to multiple ports and queuing of packets or frames prior to transfer to an output port.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module" or "logic."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

What is claimed is:

1. A network interface comprising:
an interface and at least one processor communicatively coupled to the interface, wherein the at least one processor is to:
select a first transmit queue to provide data for transmission, cause transmission of data associated with the first transmit queue based on the selection of the first transmit queue, maintain the first transmit queue in a wake state based at least in part on tokens associated with the first transmit queue, after the data transmission, being zero or positive;
set a token accumulation rate for the first transmit queue to a reduced rate based at least in part on the first transmit queue having no additional data to transmit;
selectively allow another transmission of data from the first transmit queue or cause the first transmit queue to enter a sleep state based at least in part on tokens associated with the first transmit queue after the data transmission and whether the first transmit queue stores data to transmit, and based on receipt of a congestion message, reduce the token accumulation rate associated with the first transmit queue to a lower rate.

2. The network interface of claim 1, wherein the at least one processor is to:
cause the first transmit queue to enter the sleep state based at least in part on tokens associated with the first transmit queue, after the data transmission, being a negative amount, schedule a wake-up of the first transmit queue when a zero token balance is to occur based on the token accumulation rate associated with the first transmit queue, and set the token accumulation rate associated with the first transmit queue to a next higher rate based at least in part on the first transmit queue having additional data to transmit.

3. The network interface of claim 1, wherein the at least one processor is to:
cause the first transmit queue to enter the sleep state based at least in part on tokens associated with the first transmit queue, after the data transmission, being a negative amount, schedule a wake-up of the first transmit queue when a zero token balance is to occur based on the token accumulation rate associated with the first transmit queue, and set the token accumulation rate for the first transmit queue to a reduced rate based at least in part on the first transmit queue having no additional data to transmit.

4. The network interface of claim 1, wherein the at least one processor is to: in response to detection of a determined wake-up time of the first transmit queue, set the token accumulation rate for the first transmit queue to a reduced rate based at least in part on the first transmit queue having no data to transmit at the determined wake-up time.

5. The network interface of claim 1, wherein to select the first transmit queue to provide the data for transmission, the at least one processor is to select the first transmit queue among other transmit queues that are in a wake-state.

6. At least one non-transitory computer-readable medium comprising instructions stored thereon, that if executed by at least one processor, cause the at least one processor to:
select a transmit queue from which a portion of stored data is to be transmitted in a packet as a data transmission;
selectively allow another transmission of data from the transmit queue or cause the transmit queue to enter a sleep state based at least in part on a number of accumulated tokens associated with the transmit queue after the data transmission and whether the transmit queue stores data to transmit after the data transmission;
and based on receipt of a congestion message, reduce a token accumulation rate associated with the transmit queue to a lower rate and lengthen a time to wake-up the transmit queue.

7. The at least one computer-readable medium of claim 6, comprising instructions stored thereon, that if executed by the at least one processor, cause the at least one processor to: select the transmit queue from one or more candidate transmit queues, the candidate transmit queues being in a wake state.

8. The at least one computer-readable medium of claim 6, comprising instructions stored thereon, that if executed by the at least one processor, cause the at least one processor to: select the transmit queue from multiple candidate transmit queues, the multiple candidate transmit queues being in a wake state and permit data associated with the selected transmit queue to be transmitted.

9. The at least one computer-readable medium of claim 6, comprising instructions stored thereon, that if executed by the at least one processor, cause the at least one processor to:
cause the transmit queue to enter the sleep state based at least in part on the number of accumulated tokens being negative after the data transmission;
schedule a wake-up of the transmit queue when a zero token balance is to occur based on the token accumulation rate associated with the transmit queue;
and set the token accumulation rate to a next higher rate based at least in part on the transmit queue having additional data to transmit after the data transmission.

10. The at least one computer-readable medium of claim 6, comprising instructions stored thereon, that if executed by the at least one processor, cause the at least one processor to:
cause the transmit queue to enter the sleep state based at least in part on the number of accumulated tokens being negative after the data transmission; schedule a wake-up of the transmit queue when a zero token balance is to occur based on the token accumulation rate associated with the transmit queue; and set the token accumulation rate to a reduced rate based at least in part on the transmit queue having no additional data to transmit after the data transmission.

11. The at least one computer-readable medium of claim 6, comprising instructions stored thereon, that if executed by the at least one processor, cause the at least one processor to:
maintain the transmit queue in a wake state based at least in part on tokens associated with the transmit queue after the data transmission being zero or positive and set the token accumulation rate to a reduced rate based at least in part on the transmit queue having no additional data to transmit after the data transmission.

12. The at least one computer-readable medium of claim 6, comprising instructions stored thereon, that if executed by the at least one processor, cause the at least one processor to:
in response to detection of a determined wake-up time of the transmit queue, set the token accumulation rate for the transmit queue to a reduced rate based at least in part on the transmit queue having no data to transmit at the determined wake-up time.

13. A system comprising: a host system comprising a memory and a processor and a network interface communicatively coupled to the host system, the network interface comprising at least one processor and at least one memory, the at least one processor to:
select a transmit queue to cause data to be transmitted in a packet, selectively allow another transmission of data from the selected transmit queue or cause the selected transmit queue enter a sleep state based at least in part on a number of accumulated tokens associated with the selected transmit queue after the packet transmission and whether the selected transmit queue stores associated data to transmit after the packet transmission, and based on receipt of a congestion message, reduce a token accumulation rate associated with the transmit queue to a lower rate and lengthen a time to wake-up the transmit queue.

14. The system of claim 13, wherein the at least one processor is to: select the transmit queue from multiple candidate transmit queues, the multiple candidate transmit queues being in a wake state and permit the data associated with the selected transmit queue to be transmitted.

15. The system of claim 13, wherein the at least one processor is to: cause the transmit queue to enter the sleep state based at least in part on the number of accumulated tokens, after the data transmission, being a negative amount; schedule the wake-up of the transmit queue when a zero token balance is to occur based on the token accumulation rate associated with the transmit queue; and set the token accumulation rate to a next higher rate based at least in part on the transmit queue having additional data to transmit after the data transmission or set the token accumulation rate to a reduced rate based at least in part on the transmit queue having no additional data to transmit after the data transmission.

16. The system of claim 13, wherein the network interface comprises a wired or wireless network interface and further comprising one or more of: at least one storage device communicatively coupled to the network interface, at least one interconnect communicatively coupled to the network interface.

* * * * *